(12) United States Patent
Lee et al.

(10) Patent No.: US 10,491,409 B2
(45) Date of Patent: Nov. 26, 2019

(54) OPERATING METHOD OF SEMICONDUCTOR DEVICE PERFORMING INTELLIGENCE NEGOTIATION

(71) Applicant: Samsung Electronics Co., Ltd., Suwon-si (KR)

(72) Inventors: Jang-su Lee, Seoul (KR); Wook Choi, Hwaseong-si (KR); Jung-won Kim, Seoul (KR); Soo-yong Lee, Yongin-si (KR); Chang-keun Im, Suwon-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 118 days.

(21) Appl. No.: 15/859,958

(22) Filed: Jan. 2, 2018

(65) Prior Publication Data

US 2018/0212787 A1 Jul. 26, 2018

(30) Foreign Application Priority Data

Jan. 20, 2017 (KR) ........................ 10-2017-0009927

(51) Int. Cl.
*H04L 12/14* (2006.01)
*H04L 12/24* (2006.01)
*H04L 29/08* (2006.01)

(52) U.S. Cl.
CPC ...... *H04L 12/1492* (2013.01); *H04L 41/5054* (2013.01); *H04L 67/16* (2013.01); *H04L 67/327* (2013.01)

(58) Field of Classification Search
None
See application file for complete search history.

(56) References Cited

U.S. PATENT DOCUMENTS

| 2015/0188949 A1* | 7/2015 | Mahaffey | H04L 63/20 726/1 |
| 2016/0119434 A1 | 4/2016 | Dong et al. | |
| 2016/0163186 A1* | 6/2016 | Davidson | G06Q 50/16 340/506 |
| 2017/0272894 A1* | 9/2017 | Wang | H04W 4/70 |

* cited by examiner

*Primary Examiner* — Davoud A Zand
(74) *Attorney, Agent, or Firm* — Muir Patent Law, PLLC

(57) ABSTRACT

Provided are methods of operating a gateway and a server, performing an intelligent negotiation in an Internet of Things (IoT) network. According to an example embodiment, a method of operating the gateway of an IoT system includes receiving status information from at least one of a plurality of end devices included in a local network, determining whether to start a negotiation based on a status of the local network that is analyzed based on the status information, transmitting a negotiation request to an external device, receiving a suggestion corresponding to the negotiation request from the external device, and transmitting a reply indicating whether to accept the suggestion to the external device.

14 Claims, 18 Drawing Sheets

OPERATING METHOD OF SEMICONDUCTOR DEVICE PERFORMING INTELLIGENCE NEGOTIATION

CROSS-REFERENCE TO RELATED APPLICATION

This application claims the benefit of priority to Korean Patent Application No. 10-2017-0009927, filed on Jan. 20, 2017, in the Korean Intellectual Property Office, the disclosure of which is incorporated herein in its entirety by reference.

BACKGROUND

The present disclosure relates to an operating method of a semiconductor device performing an intelligence negotiation, and more particularly, to operating methods of a gateway and a server performing an intelligence negotiation in an Internet of Things (IoT) system.

An IoT refers to network technology that transmits and receives information between distributed configuration components and then processes the information. A component is an electronic device having various sensors and a communication function, including home appliances, mobile devices, or wearable computers.

The components and a gateway may form a local network. A cloud server connected to the local network gathers and analyzes data generated between the components by using technology of processing big data and thus, may provide an intelligent Information Technology (IT) service that creates new value for human life. IoT may apply to various sectors such as a smart home, a smart building, a smart city, a smart car or a connected car, a smart grid, healthcare, smart home appliances, high-end medical service based on conventional IT technologies and a convergence of industries.

SUMMARY

The present disclosure provides methods of operating a gateway and a server that perform an intelligence negotiation in an Internet of Things system According to an aspect of the inventive concept, there is provided a method of operating a gateway of an Internet of Things system, including receiving status information from at least one of a plurality of end devices included in a local network; determining whether to start a negotiation based on a status of the local network that is analyzed based on the status information; transmitting a negotiation request to an external device; receiving a suggestion corresponding to the negotiation request from the external device; and transmitting a reply indicating whether to accept the suggestion to the external device.

According to an aspect of the inventive concept, there is provided a method of operating a server of an Internet of Things (IoT) system, including receiving a negotiation request from an external device external to the server and at a local network, the negotiation request part of a negotiation; generating a suggestion corresponding to the negotiation request based on a status of the local network, wherein an IoT device and a gateway are included in the local network; transmitting the suggestion to the external device; and receiving a reply indicating whether to accept the suggestion from the external device.

According to an aspect of the inventive concept, a method of communicating in an Internet of Things (IoT) system, includes: receiving status information from at least one of a plurality of end devices included in a local network of the IoT system; determining to start a negotiation based on a status of the local network that is analyzed based on the status information; as a result of determining to start a negotiation, transmitting a negotiation request to an external device, and receiving the negotiation request at the external device; performing a negotiation between a first end device and the server, to determine a rule or rule-set to use by the end device for communication; and selecting and using the rule or rule-set for operations of the end device.

BRIEF DESCRIPTION OF THE DRAWINGS

Example embodiments of the inventive concept will be more clearly understood from the following detailed description taken in conjunction with the accompanying drawings in which.

DETAILED DESCRIPTION OF THE EMBODIMENTS

The present disclosure now will be described more fully hereinafter with reference to the accompanying drawings, in which various exemplary embodiments are shown. The invention may, however, be embodied in many different forms and should not be construed as limited to the exemplary embodiments set forth herein.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Figure 1:
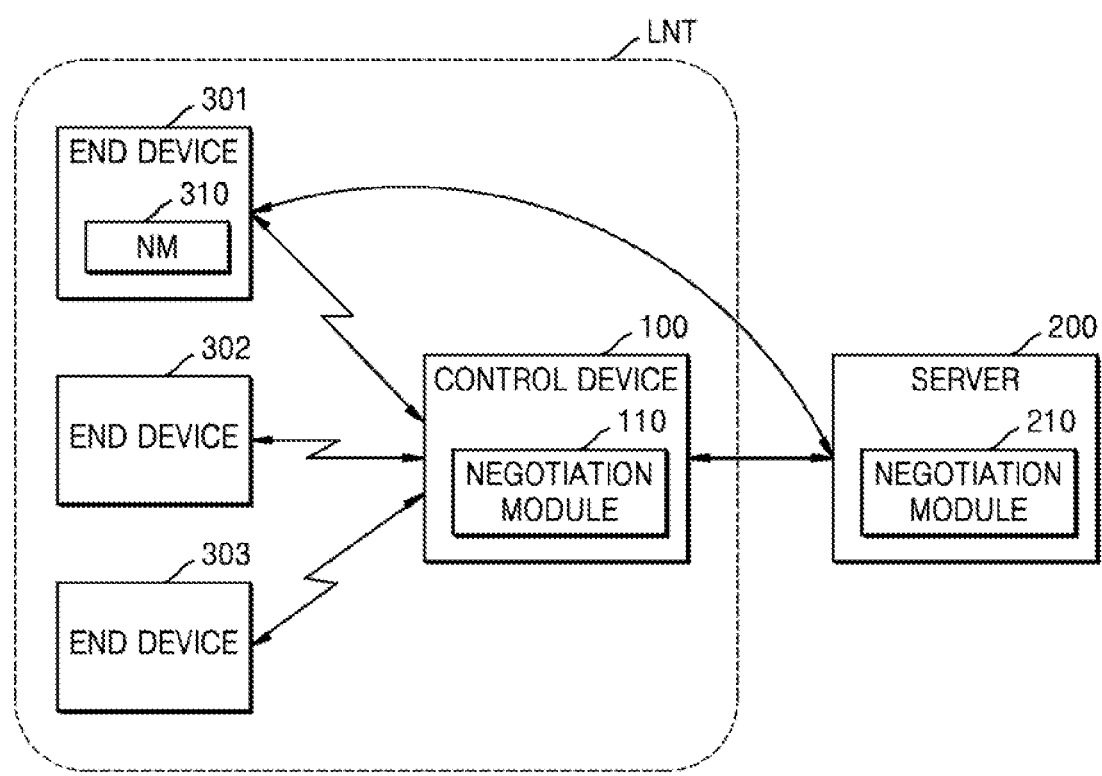
FIG. 1 illustrates a block diagram of a data processing system according to an example embodiment of the inventive concept.

FIG. 1 illustrates a block diagram of a data processing system according to an example embodiment of the inventive concept; A data processing system 1000 of FIG. 1 may be an Internet of Things (IoT) network system, a Ubiquitous Sensor Network (USN) communication system, a Machine Type Communications (MTC) communication system, a Machine Oriented Communication (MOC) communication system, a Machine to Machine (M2M) communication system, or a Device to Device (D2D) communication system. However embodiments are not limited thereto, and the data processing system 1000 may be various kinds of systems that process data through wired or wireless communication between devices of the data processing system 1000.

Referring to FIG. 1, the data processing system 1000 may include a server 200, a control device 100 and end devices 301, 302, and 303. For example, the server 200, the control device 100, and the end devices 301, 302, and 303 may respectively correspond to a cloud server, a gateway, and IoT devices of an IoT network system.

A transmittance protocol such as a User Datagram Protocol (UDP), a Transmission Control Protocol (TCP), an IPv6 Low-power Wireless Personal Area Networks (6LoWPAN) protocol, an IPv6 internet routing protocol, and an application protocol such as a Constrained Application Protocol (CoAP), a Hypertext Transfer Protocol (HTTP), a Message Queue Telemetry Transport (MQTT), an MQTT for Sensors networks (MQTT-S) may be used for communicating between devices of the data processing system 1000, such as the server 200, the control device 100, and the end devices 301, 302, and 303.

The end devices 301, 302, and 303 may collect data using sensors or transmit the collected data to the outside through a wired or wireless communication interface. Also, the end devices 301, 302, and 303 transmit and receive control information and data through a wired or wireless communication interface. The end devices 301, 302, and 303 may have various computing capabilities or communication capabilities.

The end devices 301, 302, and 303 may be embodied as IoT devices, but are not limited thereto. An IoT device may include an accessible interface (e.g., a wired interface and/or a wireless interface). The IoT device may refer to a device capable of transmitting and receiving data (wired data or wireless data) with at least one electronic device (or IoT device) through an accessible interface. Here, the accessible interface may include a wired local area network (LAN), a wireless local area network (WLAN) such as Wireless Fidelity (Wi-Fi), a wireless personal area network (WPAN) such as a Bluetooth, a wireless universal serial bus (USB), a ZigBee, a Near Field Communication (NFC), a Radio Frequency Identification (RFID), or a communication interface that can be connected to a mobile cellular network. For example, a mobile communication network may include a 3rd Generation (3G) mobile communication network, a 4th Generation (4G) mobile communication network, a Long Term Evolution (LTE) mobile communication network or LTE-Advanced (LTEA) mobile communication network, but embodiments are not limited thereto.

The end devices 301, 302, and 303 may be electronic devices that include transmission and receiving components, and may include processing components and storage components as well. For example, some end devices 301, 302, or 303 may include hardware, and software and/or firmware configured to perform various processing, storage, and communication tasks.

The control device 100 may be connected to the end devices 301, 302, and 303 to control the end devices 301, 302, and 303 and exchange data with the end devices 301, 302, and 303. The control device 100 may monitor or manage the attributes, activities, or other statuses associated with the end devices 301, 302, and 303. The control device 100 may form a local network LNT with the end devices 301, 302, and 303. The control device 100 may communicate with the end devices 301, 302, and 303 via the wired or wireless network described above.

The control device 100 may collect data from the end devices 301, 302, and 303 and transmit the collected data or information obtained from the collected data to other devices on the external network (e.g., the server 200 or another gateway device). As such, the control device 100 may play a role as a gateway. For example, the control device 100 may include hardware, and software and/or firmware configured to perform processing, storage, and communications in connection with the end devices 301, 302, and 303. In some embodiments, the control device 100 may be a standalone device, such as a smart phone, tablet, desktop or laptop computer, or other specialized equipment such as a network gateway, configured to communicate with the end devices 301, 302, and 303, as well as server 200, in order to perform the various communication and control processes described further below.

The control device 100 may communicate with at least one server 200 (e.g., a cloud server) via a wired or wireless communication network. In a data processing system 1000, the overall communication network may be referred to as a core network. The communication network may include the Internet, a mobile communication network, a satellite communication network, or other public communication networks. Smaller networks discussed herein may be described as local networks, or sub-networks.

The control device 100 may receive or download, from a server, a software program including a rule and a rule-set (referred to as a rule topology) related to various operations of the end devices 301, 302, and 303 and/or the control device 100 such as processing functions, control functions or configurations (hereinafter, the various operations are referred to as intelligence.)

The server 200 may store or analyze transmitted data. The server 200 may store information related to at least one of the end devices 301, 302, and 303 and may analyze the data transmitted from the end devices 301, 302, and 303 based on the stored information. In addition, the server 200 may transmit an analysis result to the control device 100, the end devices 301, 302, and 303, or other user devices via a communication network. For example, the server 200 may use the collected data to form big data and provide intelligent services to the end devices 301, 302, and 303 or user devices based on the big data.

Also, the server 200 may make a rule or a rule-set that defines an intelligence of the end devices 301, 302, and 303 and the control device 100 and provide the rule or the rule-set to the control device 100 or the end devices 301, 302, and 303.

The server 200 may include, for example, hardware and/or software configured to perform these functions. For example, the server 200 may be a standalone computer, a plurality of computers in communication with each other, or a portion of a computer (e.g., software and/or hardware), that includes communication components and processing components to provide data processing and communication with other devices in the data processing system 1000.

The server may communicate with the end devices 301, 302, and 303 via the control device 100 or directly with the end devices 301, 302, and 303.

On the other hand, in the data processing system 1000 according to an example embodiment, each of the devices, i.e., the server 200, the control device 100 and the end devices 301, 302, and 303, may dynamically determine an intelligence of the devices by a negotiation therebetween, considering each policy, status, and computing resource.

For example, the control device 100 may analyze the status of the local network LNT (Hereinafter, referred to as the local status) and negotiate with the server 200 to optimize the local status. The control device 100 may negotiate with the server 200 based on a local status and a local policy and determine an intelligence of the control device 100 or the end devices 301, 302, and 303 by a negotiation. Negotiation targets may vary, and the above-mentioned intelligence, intelligence-related policies and rules may be negotiated.

In this regard, at least two of the server 200, the control device 100, and the end devices 301, 302, and 303 may include negotiation modules 110, 210, and 310 in order to negotiate with each other. Although each of the server 200, the control device 100, and the end device 301 is described as having a negotiation module in FIG. 1, embodiments are not limited thereto. Two or more of the server 200, the control device 100, and the end device 301 may include a negotiation module. In an example embodiment, the server 200 and the control device 100 may include the negotiation modules 110 and 210, respectively.

The negotiation modules 110, 210, and 310 may be embodied by, for example, software, firmware, or a combination of software and firmware. The negotiation modules 110, 210 and 310 may be stored in a memory of each of the server 200, the control device 100, and the end device 301 and may be operated by being executed by a processor of each of the server 200, the control device 100, and the end device 301.

As described above, the data processing system 1000 according to an example embodiment of the inventive concept may dynamically determine an intelligence by a negotiation between at least two of the devices, such as the server 200, the control device 100 and the end devices 301, 302, and 303. Thus, an individual status of each device, an overall status, the status of the local network LNT and/or a core network may be considered in determining the intelligence or changing the intelligence. Accordingly, a load may be distributed among the devices, and functions of the devices may be optimized. In addition, utilization of computing resources may be optimized, and traffic overhead incurred between the devices may be reduced. Thus, the performance of the data processing system 1000 may be improved.

Figure 2:
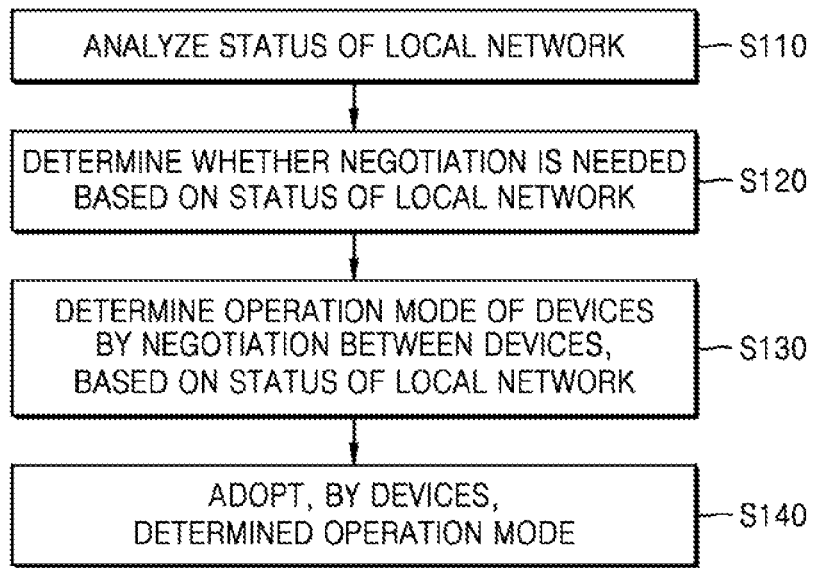
FIG. 2 illustrates a method of operating the data processing system of FIG. 1.

FIG. 2 illustrates a method of operating the data processing system 1000 of FIG. 1.

Referring to FIG. 2, at least one of the devices (i.e., the server 200, the control device 100 and the end devices 301, 302, and 303) of the data processing system 1000 may analyze the status of the local network LNT (S110). For example, the control device 100 may analyze the status of the local network LNT. The control device 100 may receive status information from at least one of the end devices 301, 302, and 303 and analyze the status of the local network LNT based on the status information. The status information includes various information on the input and output of the end devices 301, 302, and 303, hardware resources, environment, and the like. For example, the status information may include information on a remaining battery level (i.e., remaining battery power), an amount of data to be generated, operation status (normal or abnormal operation, etc.) for each of the end devices 301, 302 and 303. For example, the status of the local network LNT may include the remaining battery level, a traffic level, data reliability, an energy level and network quality of service (QoS) of the local network, an amount of data generated per unit time in the local network and the like. For example, the control device 100 may analyze the remaining battery level of the local network based on the remaining battery levels received from the end devices 301, 302, and 303, respectively. The control device 100 may analyze (or calculate) the remaining battery level of the local network by averaging the remaining battery levels received from the end devices 301, 302, and 303, respectively. Also, the control device 100 may analyze the battery consumption rate of the local network based on the remaining battery levels received from the end devices 301, 302, and 303, periodically or non-periodically.

At least one of the devices of the data processing system 1000 may determine whether negotiation is needed (S120). A device for determining whether or not a negotiation is needed may be the same as or different from a device for analyzing a status of a local network LNT.

For example, the control device 100 may determine whether negotiation is needed. The control device 100 may determine whether a negotiation is needed by comparing the analyzed status of the local network LNT with a predetermined condition or by predicting the status of the local network LNT based on the analyzed status of the local network LNT. For example, the control device 100 compares the remaining battery level of the local network LNT with a threshold value, and if the remaining battery level is less than the threshold value, the control device 100 may determine that negotiation is needed. For another example, the control device 100 compares the battery consumption rate of the local network LNT with a reference value, and if the battery consumption rate exceeds the reference value, the control device 100 may determine that negotiation is needed.

The operation mode (operation method) of the devices may be determined by a negotiation between the devices based on a status of a local network (S130). For example, when the control device 100 determines that a negotiation is needed, the control device 100 may request the negotiation to another device, such as the server 200 or the end devices 301, 302, and 303. Hereinafter, for convenience of explanation, a device requesting a negotiation will be referred to as a requestor, and a device accepting a request for the negotiation will be referred to as a responder.

As described with reference to FIG. 1, the negotiation object may include various operations (function, service, configuration) performed by the server 200, the control device 100 and the end devices 301, 302, and 303, which are intelligences. In addition, a policy and a rule corresponding to the intelligence may be a negotiation object.

In an example embodiment, an intelligence may include data processing (or data intelligence), network control (or network intelligence), system configuration, and the like. The data processing may include data aggregation, data filtering, data conversion, data analysis, data mining, data prediction and the like. The network control may include channel allocation, traffic control, network size control, network failure analysis and the like. The system configuration is a configuration of devices and may include an energy setting, a sensing period, a report period, a mode setting, a security setting and the like.

Devices performing a negotiation, i.e., a requestor and a responder, may perform the negotiation by a process of receiving a suggestion and transmitting a response such as 'rejection', 'counter suggestion' or 'acceptance' to the suggestion. The requestor and the responder may derive an intelligence with the greatest profit based on a set policy for the local network and a status of a local network. The policies may include policies on hardware resources such as CPU, memory, storage, etc., data amount, traffic amount, QoS, remaining energy levels, and a lifetime. For example, the policy may include an upper limit value for a CPU usage amount, a memory usage amount, an upper limit value for a traffic amount, a lower limit value or an average value for QoS, and the like. The requestor and responder may derive an intelligence that optimizes a status of a local network, a function of each device, or utilization of computing resources of a data processing system.

Devices may adopt the determined operation mode, for example, an intelligence (S140). For example, the devices may adapt to the determined mode of operation. In an example embodiment, a responder may make a rule or a rule-set for defining an intelligence of devices based on the determined intelligence and a policy or a rule corresponding to the determined intelligence and may transmit the made rule or rule-set to a requestor. For example, a rule for data processing may define which data processing to perform among the various types of data processing (e.g., data aggregation, data filtering, data conversion, data analysis, data mining, data prediction and the like). In addition, a rule for network control may include sequences or algorithms related to network control, and parameters, reference values, and the like related to the sequences or algorithms. A rule for system configuration may include setting values related to energy setting, sensing period, report period, mode setting, and security setting. The rules for the network control and the system configuration may further include a minimum value (or average value) for data reliability. The requestor may adopt the received rule or rule-set and adapt to the received rule or rule-set. The responder may also be operated based on the rule or rule-set.

For example, when the control device 100 and the server 200 respectively correspond to a requestor and a responder, the server 200 may make a new rule or rule-set based on contents determined by a negotiation, for example, the determined intelligence, policy or rule, and may transmit the content to the control device 100 as a result of the negotiation. The control device 100 may adopt the rule or rule-set described above and perform the specified intelligence accordingly. The control device 100 may perform a processing function defined by the received rule, control the end devices 301, 302, and 303, control the local network LNT, or set a system configuration. For example, the control device 100 may adapt to the received rule.

Figure 3:
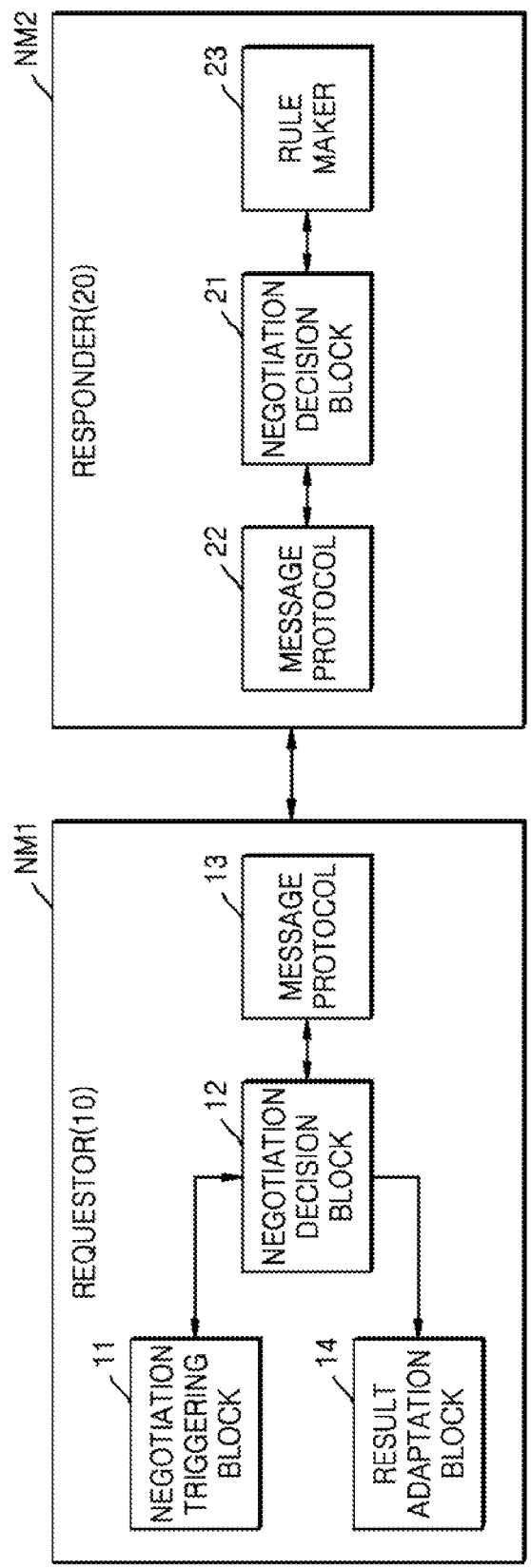
FIG. 3 illustrates a schematic block diagram showing a negotiation module according to an example embodiment of the inventive concept.

FIG. 3 illustrates a block diagram showing a negotiation module according to an example embodiment of the inventive concept;

A "module" used herein may refer a unit including, for example, hardware, software or firmware, or a combination of two or more of them. The "module" may be interchangeably used with terms such as, for example, a unit, a logic, a logical block, a component, or a circuit. The "module" may be a minimum unit of an integrally constructed component or a part thereof. The "module" may be a minimum unit for performing one or more functions or a part thereof. The "module" may also be embodied mechanically or electronically. For example, the "module" may include at least one of an application-specific integrated circuit (ASIC) chip, a field-programmable gate array (FPGA) and a programmable-logic device for performing an operation that is known or to be developed. In an example embodiment, the "module" may be embodied as an instruction stored on a computer-readable storage medium. When the instruction is executed by a processor, one or more processors may perform a function corresponding to the instruction. The computer-readable storage medium may include hard disks, floppy disks, magnetic media (e.g., magnetic tape), optical media (e.g., compact disc read only memory (CD-ROM), digital versatile disc (DVD), magneto-optical media (e.g., a floptical disk)), a hardware device (e.g., read only memory (ROM), random access memory (RAM), or flash memory). In addition, the program instructions may include machine language code such as those generated by a compiler, as well as high-level language code that may be executed by a computer using an interpreter or the like.

Referring to FIG. 3, a negotiation module NM1 of a requestor 10 may include a negotiation triggering block 11, a negotiation decision block 12, a message protocol 13, and a result adaptation block 14. A negotiation module NM2 of the responder 20 may include a negotiation decision block 21 and a message protocol 22. The negotiation module NM2 of the responder 20 may further include a rule maker 23.

The negotiation triggering block 11 may determine whether to start a negotiation based on a local status. In an example embodiment, the negotiation triggering block 11 may determine whether the local status meets a triggering condition and then determine to start a negotiation when the triggering condition is met.

For example, the negotiation triggering block 11 may determine whether a local status meets a triggering condition based on a threshold condition, such as a threshold value, a throughput, a slope or a predicted value, of a local status. As another example, when a requestor receives a new rule or rule-set, the negotiation triggering block 11 may determine whether to adopt the new rule or rule-set received based on a local status, and when the received new rule or rule-set is not adopted, the negotiation triggering block 11 may determine to start negotiation. The negotiation triggering block 11 may request a negotiation from the negotiation decision block 12. In an example embodiment, the negotiation triggering block 11 may determine whether a local status meets a triggering condition based on an algorithm such as a deep learning and a machine learning or may determine whether a new rule or rule-set is adopted. In addition, the negotiation triggering block 11 may analyze a local status based on an algorithm relating to the local status and then determine whether to start negotiation.

The negotiation decision block 12 may perform negotiation. The negotiation decision block 12 may generate a suggestion or may determine whether to accept a received suggestion. The negotiation decision block 12 may provide a message (or a signal) regarding 'negotiation request', 'suggestion', 'suggestion rejection', 'suggestion acceptance', or 'suggestion re-request' to the message protocol 13.

The message protocol 13, also described as a message protocol interface may convert the received message according to a protocol defined between the requestor 10 and the responder 20 and may transmit the converted message.

The result adaptation block 14 may adopt a negotiation result determined by a negotiation, i.e., an intelligence, a policy, or a rule or rule-set, and may adapt to the negotiation result. The result adaptation block 14 may control the requestor 10 to operate according to the negotiation result.

The negotiation decision block 21 and the message protocol 22 (e.g., message protocol interface) in the responder 20 operate in substantially same manner as the negotiation decision block 12 and the message protocol 13 in the requestor 10, and thus repetitive descriptions thereof are omitted.

The rule maker 23 may make a rule or rule-set for defining an intelligence of devices based on an intelligence determined by a negotiation, and a policy or rule corresponding to an intelligence. The made rule or rule-set may be transmitted to the requestor 10 as a negotiation result.

In FIG. 3, the negotiation module NM1 of the requestor 10 and the negotiation module NM2 of the responder 20 are described as having different configurations. However, embodiments are not limited thereto. The negotiation module NM1 of the requestor 10 and the negotiation module NM2 of the responder 20 may include the same configurations. However, different configurations may be activated and operated depending on a case in which a device including a negotiation module is to operate as the requestor 10 or the responder 20.

Figure 4:
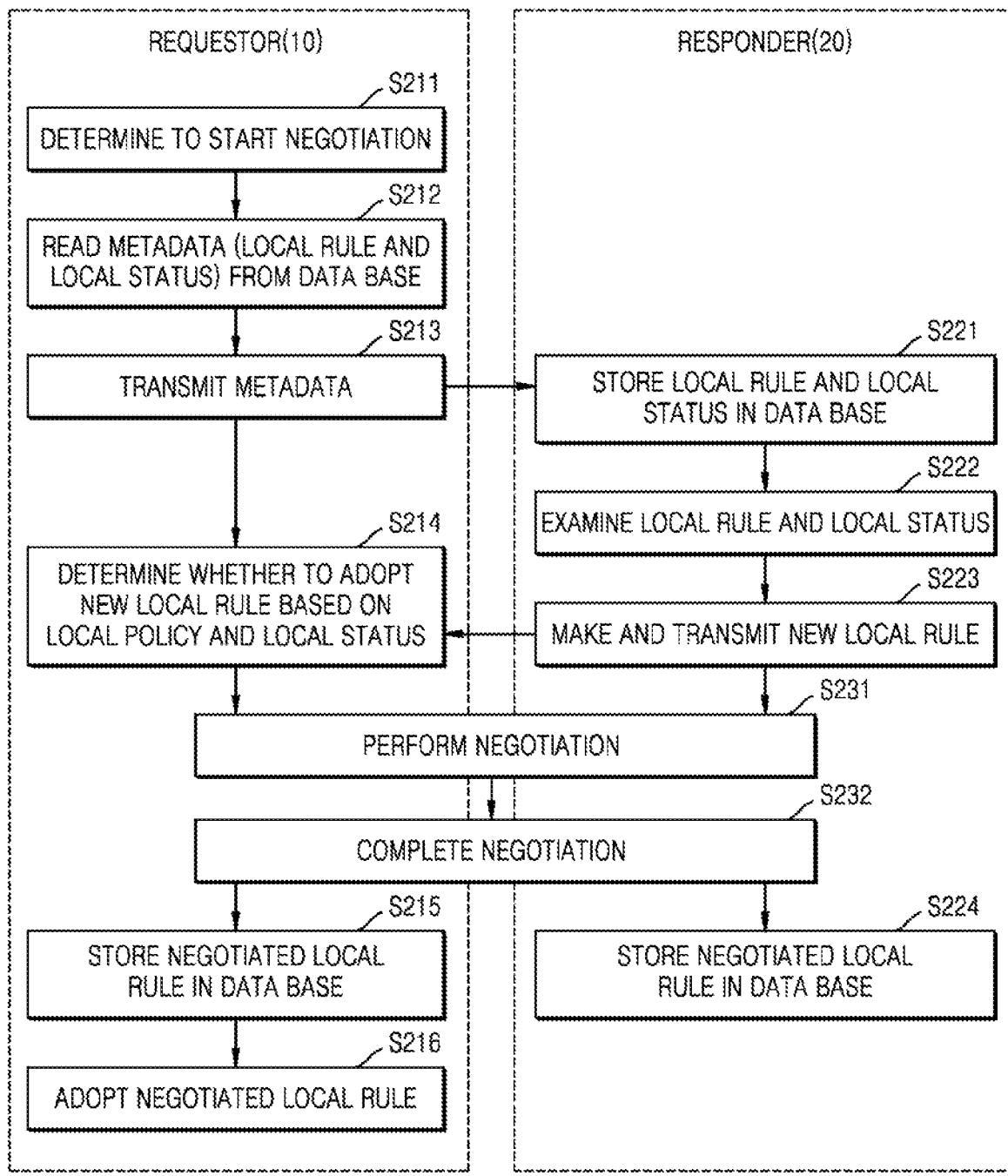
FIG. 4 illustrates a schematic block diagram showing a negotiation process according to an example embodiment of the inventive concept.

FIG. 4 illustrates a schematic block diagram showing a negotiation process according to an example embodiment of the inventive concept. FIG. 4 illustrates an example embodiment showing a process of negotiating a rule of an intelligence. For example, the requestor 10 and the responder 20 in FIG. 4 respectively correspond to the control device 100 and the server 200 of the data processing system 1000 in FIG. 1.

Referring to FIG. 4, the requestor 10 may determine to start a negotiation (S211), and may read metadata from an internal database DB (S212). The metadata may include, for example, a local rule or local status of a local network. The requestor 10 may transmit the metadata to the responder 20 (S213). In an example embodiment, the requestor 10 may transmit a negotiation request to the responder 20 with the metadata. As the requestor 10 transmits the metadata to the responder 20, reference information for obtaining a negotiation result may be shared between the requestor 10 and the responder 20. In an example embodiment, the metadata may be transmitted to the responder 20 in operation S211. For example, the server 200 of the data processing system 1000 (FIG. 1) may periodically receive metadata for the local network LNT.

The responder 20 may store the received metadata, i.e. the local rule and local status in the internal database DB (S221). In an example embodiment, the responder 20 may store the received metadata in the internal database DB and analyze the stored metadata. Accordingly, the responder 20 may obtain historical information of the local network LNT.

The responder 20 may examine the local rule and local status (S222). The responder 20 may make a new local rule based on a result of the examination and transmit the new local rule to the requestor 10 (S223). Thus, a negotiation may start.

The requestor 10 may determine whether to adopt the new local rule received based on a local policy and local status (S214). For example, the requestor 10 may determine whether to adopt the new local rule by examining whether an intelligence defined by the new local rule meets the local policy or whether an operation according to the intelligence fits the local status.

When the requestor 10 determines not to adopt the new local rule, the requestor 10 and the responder 20 may perform the negotiation (S231). The requestor 10 and the responder 20 may continue the negotiation. As the requestor 10 and the responder 20 transmit and receive a suggestion, e.g., a new local rule, and provide a response thereof, the requestor 10 and the responder 20 may make a local rule defining an intelligence that maximizes the profit of the local network LNT while abiding by the local policy, thereby completing the negotiation (S232).

When the negotiation is completed, the requestor 10 may store the negotiated local rule, i.e., the local rule obtained from the negotiation, in the internal database DB (S215) and adopt the negotiated local rule (S216). Components of the requestor 10 may adapted to the negotiated local rule. The responder 20 may also store the negotiated local rule in the internal database DB (S224). In an example embodiment, when performing some functions, the responder 20 may also operate regarding the negotiated local rule.

Figure 5:
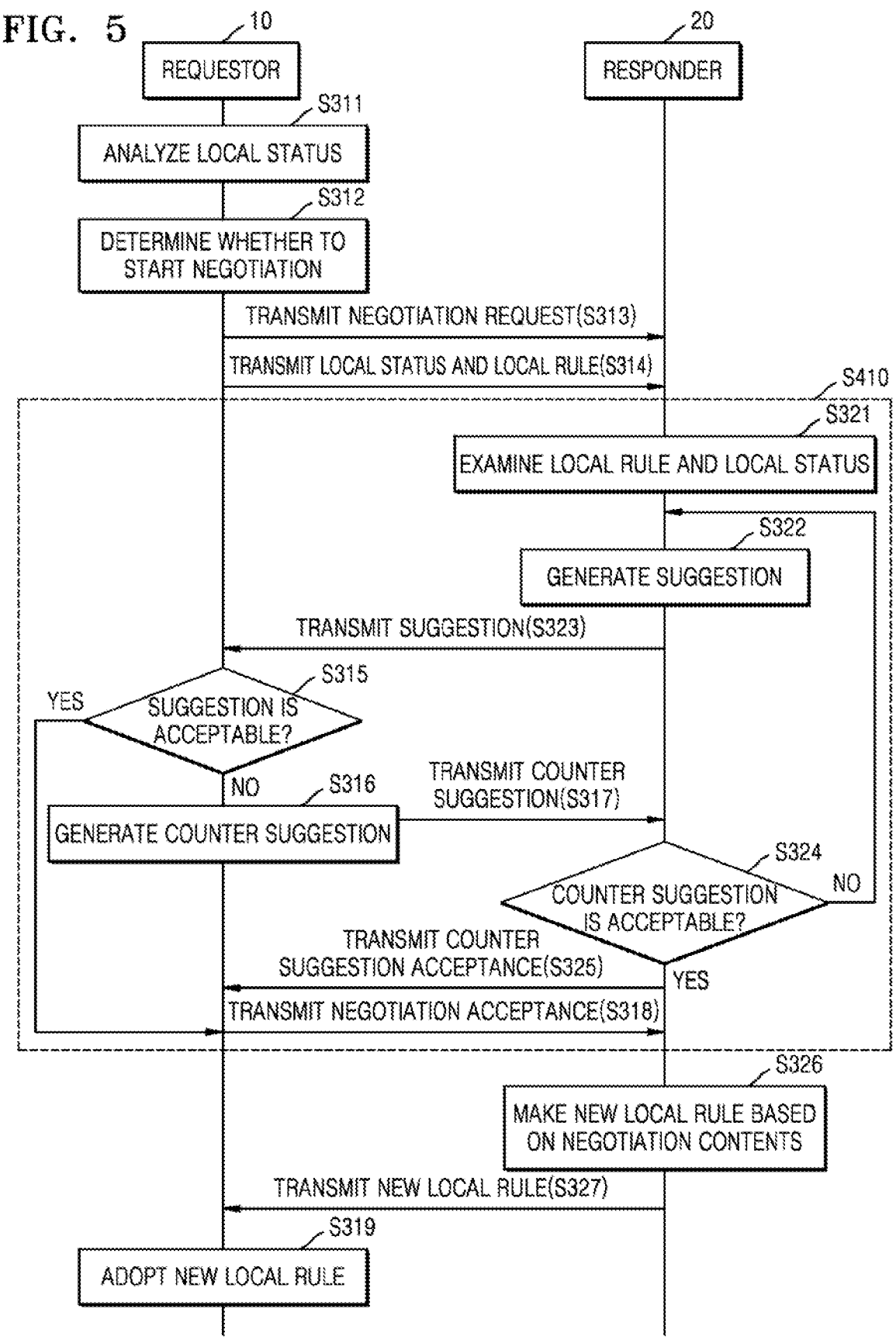
FIG. 5 illustrates a flow diagram showing a negotiation sequence according to an example embodiment of the inventive concept.
Figure 6:
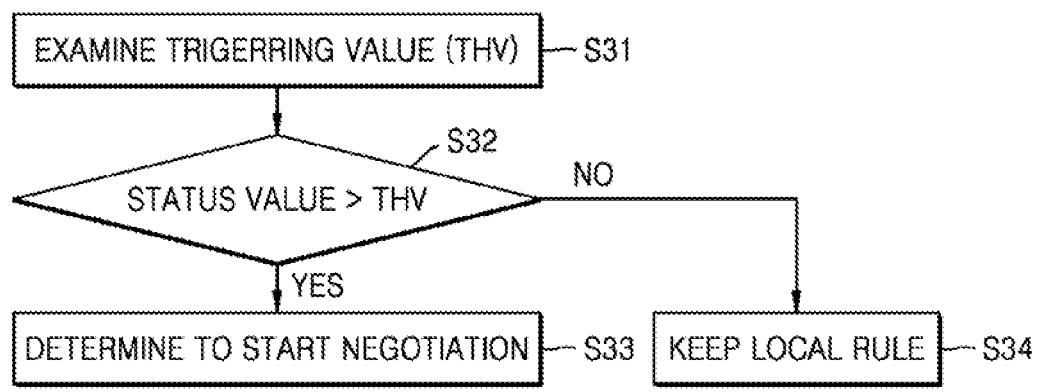
FIG. 6 illustrates a flowchart showing an example embodiment of an operation of determining whether to start a negotiation in FIG. 5.

FIG. 5 illustrates a flowchart showing a negotiation sequence according to an example embodiment of the inventive concept, and FIG. 6 illustrates a flowchart showing an example embodiment of an operation of determining whether to start a negotiation in FIG. 5.

A negotiation sequence of FIG. 5 may apply to the data processing system 1000 in FIG. 1. For example, the requestor 10 and the responder 20 of FIG. 5 may respectively correspond to the control device 100 and the server 200 of the data processing system 1000. In this regard, the descriptions with reference to FIG. 1 may also be applied to the example embodiment of FIG. 5.

Referring to FIG. 5, the requestor 10 may analyze a status of a local network (hereinafter, referred to as the local status) (S311). For example, when the requestor 10 is the control device 100, the control device 100 may receive status information from at least one of the end devices 301, 302, and 303 and analyze a local status of the local network LNT based on the received status information.

The requestor 10 may determine whether to start a negotiation based on the local status (S312). Referring to FIG. 6, the requestor 10 may examine a triggering value, i.e., a triggering condition (S31). The triggering value may include a threshold value, a throughput, a slope or a predicted value, of the local status. For example, a threshold value related to a lifetime, a traffic level, an energy level, data reliability or the like, of a local network, may be pre-set as the triggering value.

The requestor 10 may compare a status value indicating the local status with the triggering value, and thus may determine whether a negotiation is needed (S32). For example, with regard to a traffic level, the requestor 10 may compare a current traffic level value with a triggering traffic level value threshold, and based on the current traffic level value's relationship to the triggering traffic level value threshold (e.g., the current traffic level value is greater than the threshold), a determination of whether a negotiation is needed can be made.

When it is determined that a negotiation is needed, the requestor 10 may determine to start the negotiation (S33). Otherwise, when it is determined that a negotiation is not needed, the requestor 10 may keep a previous local rule (S34) and operate based on the previous local rule.

Referring to FIG. 5, when it is determined to start a negotiation, the requestor 10 may transmit a negotiation request (signal or message) to the responder 20 (S313). The requestor 10 may determine a partner to negotiate with, and transmit a negotiation request to the determined partner, i.e., the responder 20 (S313). In an example embodiment, the negotiation request may include information of a negotiation object such as an intelligence to be negotiated, and a policy or rule for the intelligence. In an example embodiment, the requestor 10 may also transmit a local status and local rule to the responder 20 (S314). Then, a negotiation process may start (S410).

The responder 20 may examine the local rule and local status (S321), and generate a suggestion based on a result of the examination (S322). The suggestion may include a newly made value, a policy level, and a rule regarding a negotiation object. For example, when a negotiation object is a kind of data processing performed by the requestor 10, the responder 20 may make processing functions (for example, data mining, data filtering, and data aggregation) performed by the requestor 10 among types of data processing, and may generate the made processing functions as content of a suggestion. The responder 20 may transmit the suggestion to the requestor 10 (S323)

The requestor 10 may determine whether the suggestion is acceptable (S315). The requestor 10 may determine whether to accept the suggestion based on a set local policy and/or local status.

When it is determined that the suggestion is not acceptable, the requestor 10 may generate a counter suggestion (S316). The requestor 10 may generate a suggestion that maximizes the profit based on the set local policy and local status (S316). The requestor 10 may transmit the counter suggestion to the responder 20 (S317).

The responder 20 may determine whether the counter suggestion is acceptable (S324). The responder 20 may determine whether the counter suggestion is acceptable, considering various factors of the responder 20 (for example, a status of the responder 20), a local policy, a local status, and an effect to the data processing system 1000 (FIG. 1) caused by acceptance of the counter suggestion.

When it is determined that the counter suggestion is not acceptable, the responder 20 may re-generate a suggestion (S322). Otherwise, when it is determined that the counter suggestion is accepted, the responder 20 may transmit a counter suggestion acceptance (signal or message) to the requestor 10 (S325).

When the requestor 10 determines that the suggestion transmitted from the responder 20 is acceptable or when the requestor 10 receives the counter suggestion acceptance from the responder 20, the requestor 10 may transmit a negotiation acceptance (signal or message) to the responder 20 (S318). Thus, the negotiation process (S410) may be completed. According to the negotiation sequence of the example embodiment, as the requestor 10 transmits a suggestion acceptance or negotiation acceptance to the responder 20, a negotiation process (S410) may be completed.

For example, the negotiation process (S410) will be described assuming that a gateway included in a local network of a smart factory negotiates with a cloud server to extend a lifetime of the local network. The local network of the smart factory includes a plurality of sensors (e.g., a plurality of end devices of the local network) and the gateway (e.g., a control device of the local network). If the expected lifetime of the local network (e.g., an average lifetime of the plurality of the sensors) is less than a threshold value (i.e. a triggering value) related to the lifetime of the local network, the gateway determines that a negotiation to extend the lifetime of the local network is needed. The gateway transmits a negotiation request to the cloud server. For example, the gateway may be the requestor 10 and the cloud server may be the responder 20. A traffic amount of the local network is related to energy consumption and the lifetime of the local network. Thus, the gateway may transmit a negotiation request for at least one rule related to the traffic amount to the cloud server. For example, the at least one rule may include a reliability of sensor data received from the plurality of sensors. If a required minimum reliability of the sensor data is 50% (i.e., 50% of correctness) and the currently set reliability of the sensor data is 90%, the cloud server may lower the set reliability of the sensor data to 80%. For example, the 80% of the set reliability may be one level (or predetermined set level) below the 90% of the set reliability. The cloud server transmits the 80% of the set reliability to the gateway as a suggestion. The gateway determines whether the 80% of the set reliability is acceptable based on a set local policy and/or local status. For example, the gateway analyzes an expected lifetime of the local network when the 80% of the set reliability is applied to the local network based on the local status and determines that the 80% of the set reliability is acceptable when the expected lifetime is greater than or equal to the threshold value related to the lifetime (e.g., a local policy which is set by a user). When the expected lifetime is less than the threshold value related to the lifetime, the gateway determines that the 80% of the set reliability is not acceptable. For example, the gateway may generate 60% of the set reliability as a counter suggestion. The 60% of the set reliability may be a value derived to maximize the lifetime of the local network based on the local status. The gateway transmits the 60% of set reliability to the cloud server as a counter suggestion. Since the required minimum reliability of the sensor data is 50%, the cloud server may accept the 60% of set reliability. However, the embodiments are not limited thereto, the cloud server may determine whether the 60% of set reliability is acceptable considering various factors. When the 60% of set reliability is acceptable, the cloud server transmits a counter suggestion acceptance to the gateway. When the 60% of the set reliability is not acceptable, the cloud server re-generates a suggestion (for example, 70% of set reliability) and transmits the suggestion to the gateway. As such, the negotiation the negotiation process (S410) may be performed between the requestor 10 and the responder 20.

Referring to FIG. 5, the responder 20 may make a new local rule based on contents of a negotiation obtained by the negotiation (S326). For example, when a negotiation is performed about an intelligence or a policy, the responder 20 may make a new local rule based on the negotiated intelligence or policy. Alternatively, when a negotiation is performed regarding a local rule, the responder 20 may make a different local rule or rule-set that is related to the local rule based on the negotiated local rule.

The responder 20 may transmit the new local rule (or rule-set) to the requestor 10 as a negotiation result (S327). The requestor 10 may adopt the received new local rule (S319). For example, according to the above-mentioned negotiation process between the gateway and the cloud server, the cloud server may make a new local rule (or new local rule-set) including a local rule for the 60% of set reliability of the sensor data, and transmit the new local rule to the gateway. The gateway adopts the new local rule. For example, the gateway extends a sensing period and reporting period of the plurality of the sensors to reduce the traffic amount within a range satisfying the new local rule that the 60% of set reliability. For another example, the new local rule-set may include local rules about a new sensing period and new reporting period of the plurality of the sensors according to the 60% of set reliability. The gateway may control the plurality of the sensors base on the new local rule-set.

The negotiation process in FIG. 5 (S410) is an aspect of an example embodiment, and the negotiation process (S410) may be embodied in various ways. For example, in FIG. 5, when the requestor 10 and the responder 20 determine that the received suggestion is not acceptable, the requestor 10 and the responder 20 may make a new suggestion. However, the requestor 10 or the responder 20 may request a partner device to transmit a new suggestion rather than making a new suggestion. Also, in FIG. 5, the requestor 10 transmits a negotiation request to the responder 20, and the responder 20 transmits a suggestion to the requestor 10. However, the requestor 10 may also transmit the suggestion along with the negotiation request to the responder 20.

For example, another example embodiment of the negotiation processor (S410) will be described assuming that a gateway included in a local network of a cargo ship negotiates with a cloud server to reduce a data amount transmitted to the cloud server. The local network of the cargo ship may include a plurality of sensors (e.g., a plurality of end devices of the local network) and the gateway (e.g., a control device of the local network). When the cargo ship leaves a port, the gateway communicates with the cloud server through a satellite communication (or a satellite channel) which is very expensive and limited in its bandwidth. Sensor data generated by the plurality of sensors in the cargo ship may include vehicle management data, GPS data, cargo data, environmental data and the like. The gateway transmits the sensor data to the cloud server through the satellite communication. If the amount of sensor data generated in the cargo ship per unit time exceeds the bandwidth of the satellite communication and/or the cost of transmitting the sensor data to the cloud server exceeds a pre-defined threshold value, the gateway may perform a negotiation for data processing functions of the gateway and related rule-set with the cloud server to reduce the data amount transmit to the cloud server. The data processing functions includes data compression, data aggregation, and data filtering. The gateway transmits a negotiation request and a suggestion to the cloud server. The suggestion may include that the data compression, the data aggregation, and the data filtering are performed by the gateway. If, according to a local rule, the cloud server is required to receive all sensor data and perform filtering the sensor data, the cloud server determines that the suggestion is not acceptable. The cloud server generates a counter suggestion and transmits the counter suggestion to the gateway. The counter suggestion may include that the data compression and the data aggregation except the data filtering are performed by the gateway.

As described above, the negotiation process (S410) may be variously changed within a range in which the requestor 10 and the responder 20 transmit and receive a suggestion and a response of the suggestion.

Figure 7A:
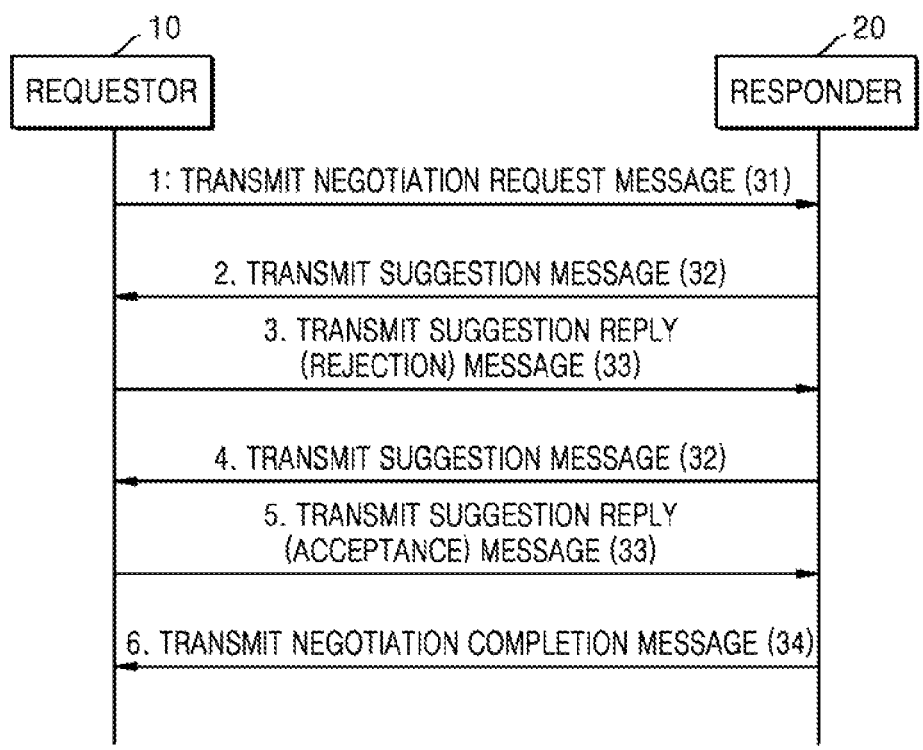
FIG. 7A illustrates an example embodiment of a message protocol sequence according to an example embodiment of the inventive concept.
Figure 7B:
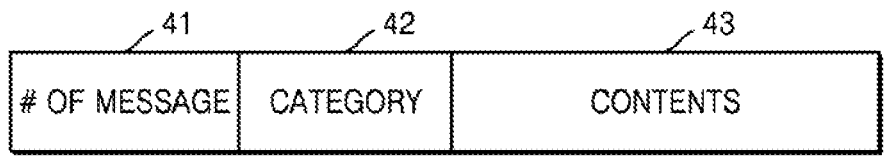
FIG. 7B illustrates an example embodiment of a message configuration of FIG. 7A.

FIG. 7A illustrates an example embodiment of a message protocol sequence according to an example embodiment of the inventive concept, and FIG. 7B illustrates an example embodiment of a message configuration of FIG. 7A.

Referring to FIG. 7A, as a negotiation proceeds, the requestor 10 and the responder 20 may transmit and receive a message therebetween. According to a message protocol, the requestor 10 and the responder 20 may transmit and receive a negotiation request message 31, a suggestion message 32, a suggestion (or negotiation) reply message 33, a negotiation completion message 34, and the like therebetween. The negotiation request message 31 may be transmitted from the requestor 10, and the negotiation completion message 34 may be transmitted from the responder 20. The suggestion message 32 and the suggestion reply message 33 may be transmitted from the requestor 10 and/or the responder 20. When a message is transmitted and received, a number may be assigned to the message while transmitting and receiving the message.

Referring to FIG. 7B, a message may include a message number field 41, a message category field 42 and a contents field 43. For example, the suggestion message 32 may include a number (41) indicating an order of messages transmitted between the requestor 10 and the responder 20, a category number (42) indicating that the message is a suggestion message, and contents (43) of the suggestion. The contents of the suggestion may include a newly made policy, rule, configuration or intelligence.

For example, the negotiation request message 31 may include a message number (e.g., 1), a category number (e.g., 31, indicating a request), and a negotiation object (e.g., the contents). In addition, the first suggestion message 32 may include a message number (e.g., 2), a category number (e.g., 32, indicating a suggestion), and a suggestion object (e.g., the contents); the first suggestion reply message 33 may include a message number (e.g., 3), a category number (e.g., 33, indicating a suggestion reply), and a suggestion reply object (e.g., rejection); the second suggestion message 32 may include a message number (e.g., 4), a category number (e.g., 32, indicating a suggestion), and a suggestion object (e.g., the contents); second suggestion reply message 33, which may be an acceptance message, may include a message number (e.g., 5), a category number (e.g., 33, indicating a suggestion), and a suggestion object (e.g., acceptance); and the negotiation completion message 34 may include a message number (e.g., 6), a category number (e.g., 34, indicating a negotiation completion), and a negotiation object (e.g., a rule or rule-set newly made according to a negotiation result). This protocol may be used by the different devices that communicate as requestors and responders within the data processing system 1000, to allow for a common communication language among the devices.

The message protocol sequence and the message configuration were described with reference to FIGS. 7A and 7B. However, FIGS. 7A and 7B only illustrate an example embodiment, and embodiments are not limited thereto. The message protocol sequence and the message configuration may vary according to a selection of a user and a designer.

Figure 8A:
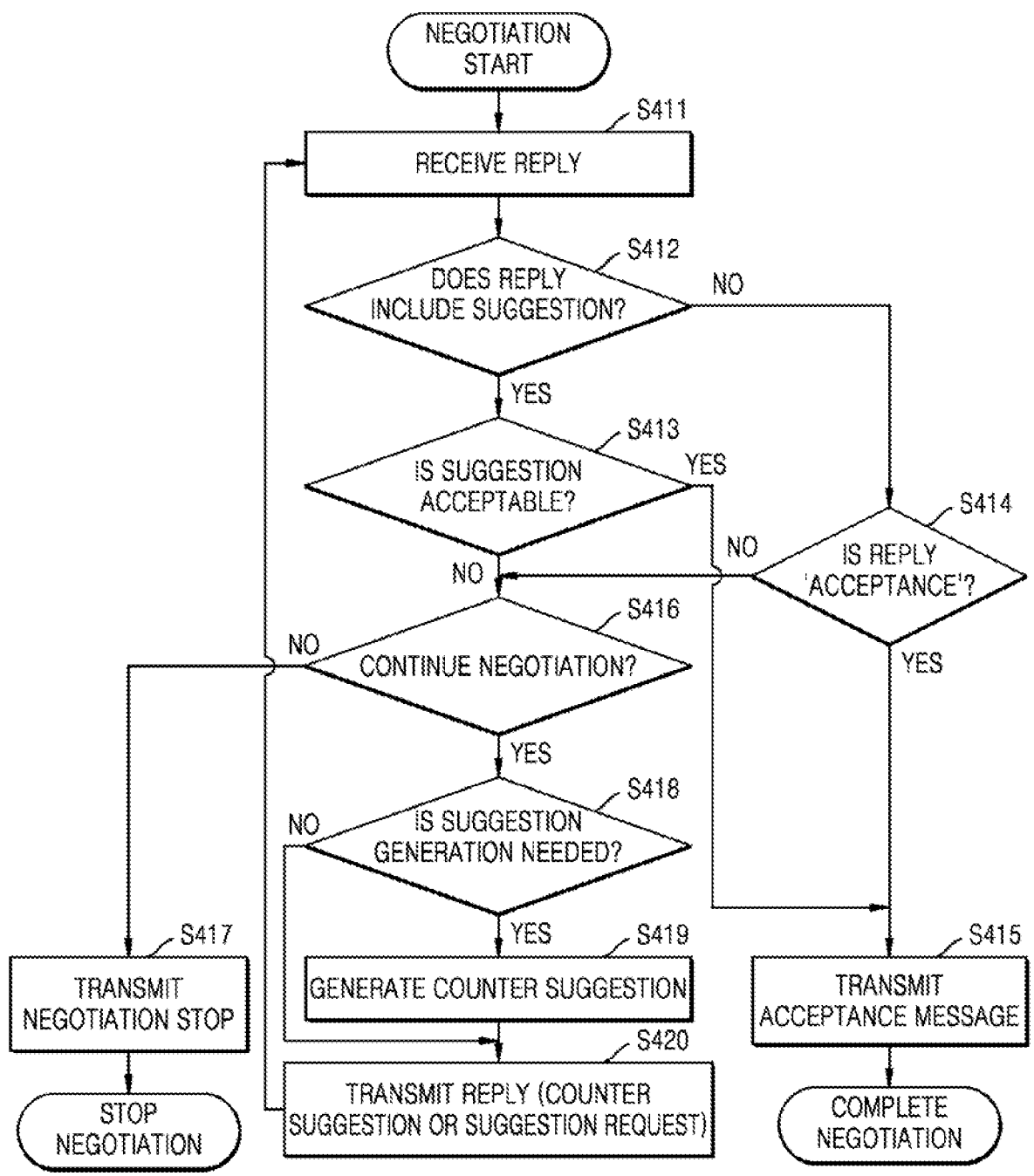
FIGS. 8A and 8B illustrate flowcharts showing an example embodiment of a negotiation decision process according to an example embodiment of the inventive concept.
Figure 8B:
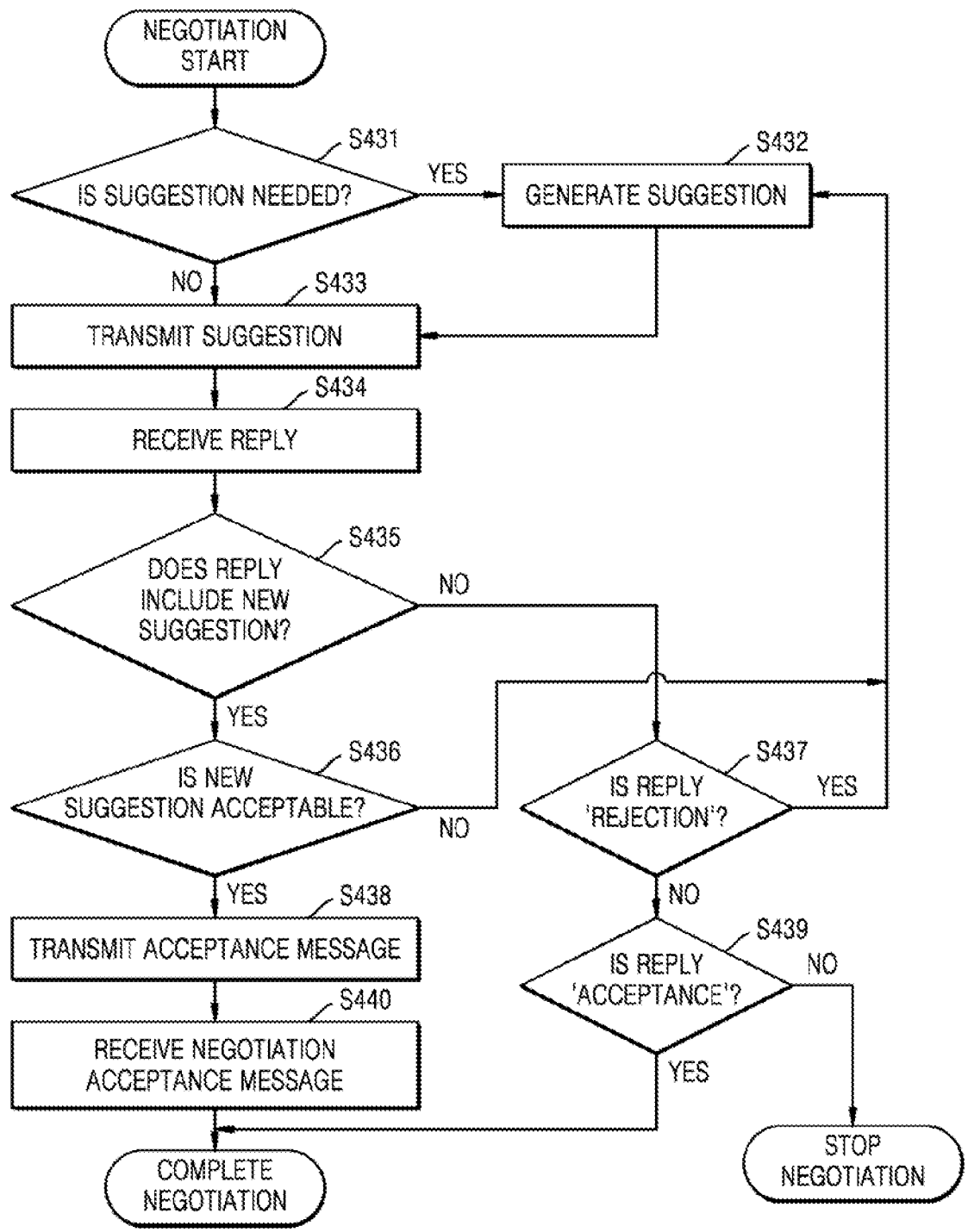

FIGS. 8A and 8B illustrate flowcharts showing an example embodiment of a negotiation decision process according to an example embodiment of the inventive concept. FIG. 8A shows a negotiation decision process of a requestor, and FIG. 8B shows a negotiation decision process of a responder. Embodiments shown in FIG. 8A and FIG. 8B may be performed, for example, by the negotiation decision block 12 of the requestor 10 and the negotiation decision block 12 of the responder 20 of FIG. 3.

Referring to FIG. 8A, the requestor 10 may wait for a reply from the responder 20 and receive the reply (S411). For example, if a negotiation has just started, a reply may include a suggestion. If a negotiation is further along in the process, a reply may include a message about whether the responder 20 accepts or rejects a suggestion.

The requestor 10 may determine whether a reply includes a suggestion (S412). For example, as described above with reference to FIG. 7B, it may be determined whether a reply includes a suggestion based on a category and contents of a message.

When a reply includes a suggestion, the requestor 10 may determine whether a suggestion is acceptable (S413). A decision on whether a suggestion is acceptable is described with reference to FIGS. 4 and 5 and thus, repetitive descriptions thereof are omitted. When a suggestion is accepted, the requestor 10 may transmit an acceptance message (S415). Otherwise, when a suggestion is not acceptable, the requestor 10 may determine whether to continue the negotiation (S416). The requestor 10 may determine whether to continue the negotiation, for example, considering a change of a local status and the like.

In operation S412, when it is determined that a reply does not include a suggestion, the requestor 10 may confirm that the reply is an 'acceptance (OK)' (S414). When the reply is 'acceptance', it means that the responder 20 accepts the suggestion (or counter suggestion) of the requestor 10, and the responder 20 and the requestor 10 reach an agreement. The requestor 10 may transmit an acceptance message (or negotiation acceptance message) to the responder 20 (S415). When a reply is not an 'acceptance', i.e., when a reply is a 'rejection (NO)', the requestor 10 may determine whether to continue the negotiation (S416).

When the negotiation cannot be continued, or when the negotiation is no longer needed, the requestor 10 may determine to stop the negotiation and transmit a message about stopping the negotiation to the responder 20 (S417).

Otherwise, when the negotiation needs to be continued, it may be determined whether a new suggestion needs to be generated (S418) by the requestor 10. In an example embodiment, when the requestor 10 does not accept a suggestion from the responder 20, the requestor 10 may be pre-set to generate a counter suggestion. For example, when the requestor 10 determines that a suggestion from the responder 20 overly exceeds a standard of the requestor 10, or that an agreement has to be reached in a short time, the requestor 10 may determine that a suggestion needs to be generated. (S418) When it is determined that the suggestion needs to be generated, the requestor 10 may generate a counter suggestion (S419) and transmit the generated counter suggestion as a reply (S420). Otherwise, when it is determined that the suggestion does not need to be generated, the requestor 10 may transmit a suggestion request as a reply. After transmitting the reply (S420), the requestor 10 may wait for a reply from the responder 20.

Referring to FIG. 8B, as a negotiation starts, the responder 20 may determine whether a suggestion is needed (S431). For example, the responder 20 may determine whether a suggestion needs to be generated. If no suggestion has been previously generated, the responder 20 may generate a suggestion (S432). The responder 20 may transmit the suggestion generated in operation S432 or the suggestion previously generated to the requestor 10 (S433).

The responder 20 may receive a reply from the requestor 10 (S434) and determine whether the reply includes a new suggestion, e.g., a counter suggestion of the requestor 10 (S435).

If the reply includes the new suggestion, the responder 20 may determine whether the new suggestion is acceptable (S436). The responder 20 may determine whether the new suggestion is acceptable based on various factors of the responder 20, a local policy, a local status, and a prediction of an acceptance result.

If the new suggestion is not acceptable, the responder 20 may re-generate a suggestion (S432). Otherwise, if the new suggestion is acceptable, the responder 20 may transmit an acceptance message to the requestor 10 (S438). Then, the responder 20 may receive a negotiation acceptance message from the requestor 10 (S440) and determine that the negotiation has been completed.

Otherwise, when the reply does not include a new suggestion, the responder 20 may determine whether the reply is a 'rejection' (S437). If the reply is a 'rejection', the responder 20 may generate a new suggestion (S432), and if the reply is not a 'rejection', it may be determined whether the reply is an 'acceptance' (S439). If the reply is an 'acceptance', the responder 20 may determine that the negotiation has been completed. If the reply is not an 'acceptance', the responder 20 may determine that the negotiation has stopped.

Figure 9:
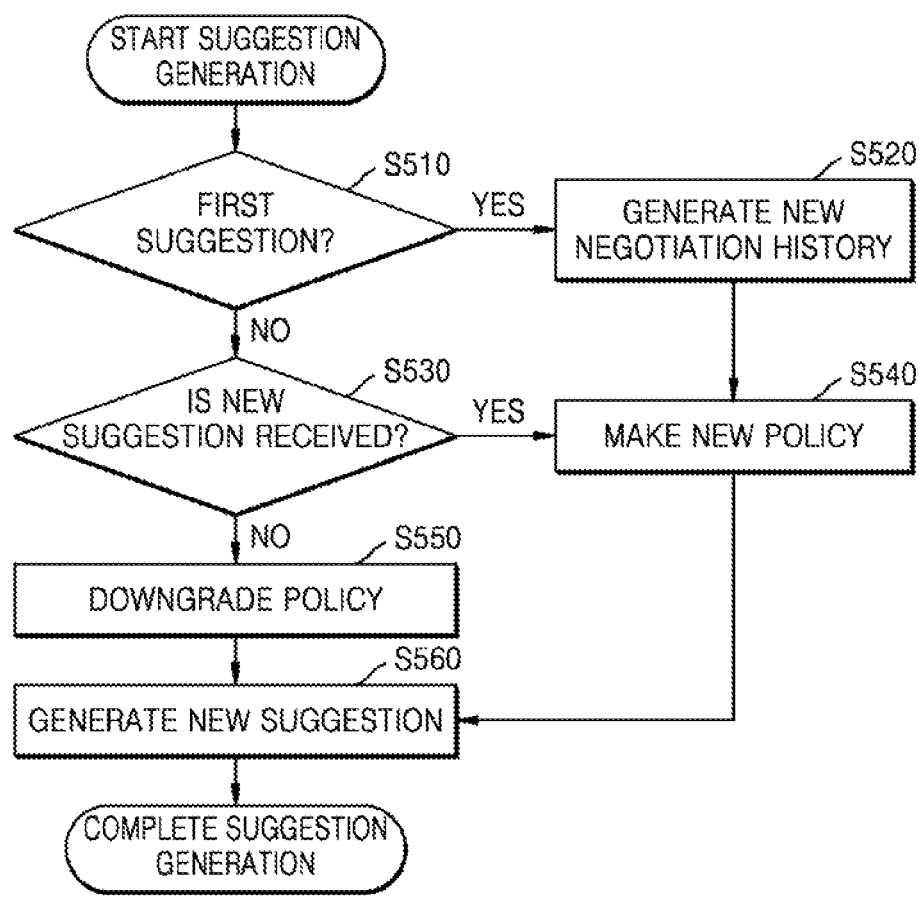
FIG. 9 illustrates a flowchart showing an example embodiment of a suggestion generation process according to an embodiment of the inventive concept.

FIG. 9 illustrates a flowchart showing an example embodiment of a suggestion generation process according to an embodiment of the inventive concept. The suggestion generation process of FIG. 9 may be performed by the negotiation decision block 12 of the requestor 10 and the negotiation decision block 12 of the responder 20 of FIG. 3. Also, the suggestion generation process of FIG. 9 may be performed in operation S418 of FIG. 8A and in operation S432 of FIG. 8B.

Referring to FIG. 9, the requestor 10 or the responder 20 (Hereinafter, referred to as a negotiation device) may determine a negotiation history (S510). The negotiation device may determine whether a suggestion is the first one generated in an ongoing negotiation (e.g., based on a message number and category number). If the suggestion is the first suggestion, the negotiation device may generate a new negotiation history (S520). For example, the negotiation device may store a history of suggestions generated and to be generated. The negotiation device may, for the negotiation, make a new policy related to a negotiation object (S540).

Otherwise, if the suggestion is not the first suggestion, the negotiation device may determine whether a new suggestion is received from a partner device (S530). If the new suggestion is received from a partner device, the received new suggestion is not acceptable and a suggestion is generated. Thus, the negotiation device may make a new policy (S540).

If the new suggestion is not received from a partner device, it may be a case in which a partner device may request a new suggestion. The negotiation device may downgrade a preexisting policy to generate a new suggestion (S550).

For example, when the server 200 (FIG. 1) negotiates a reliability of data received from the control device 100 with the control device 100, a policy for a local network may be downgraded so that the server 200 lowers the data reliability by some degrees, for example, some portions of a profit of the server 200 is abandoned. As described above, the negotiation device may change (upgrade or downgrade) a policy to generate a suggestion with which the negotiation device reaches an agreement with a partner device in a negotiation process.

The negotiation device may generate a new suggestion based on a changed policy or a newly made policy (S560). In an example embodiment described above, the server 200 may generate the lowered data reliability as a new suggestion based on the downgraded policy.

Figure 10:
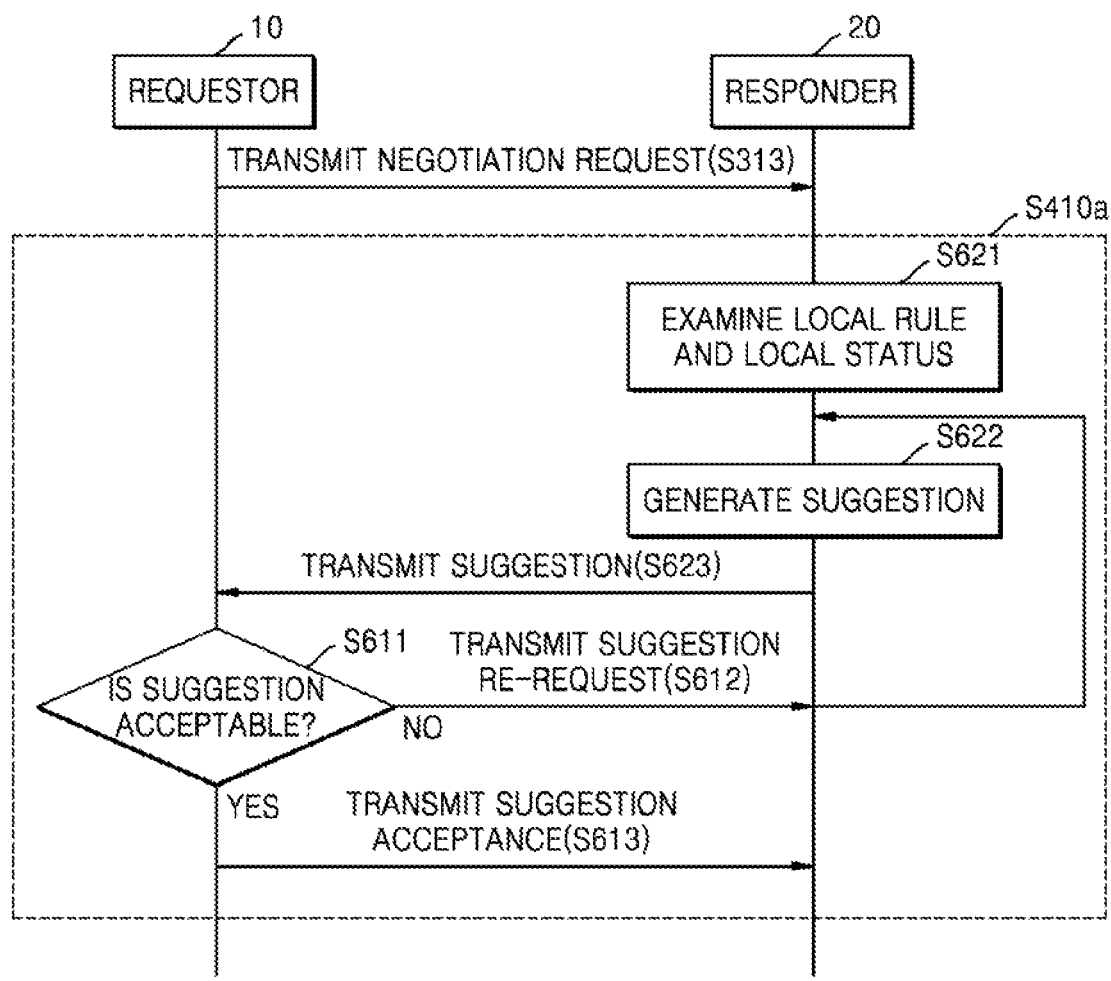
FIG. 10 illustrates a flowchart showing another example of a negotiation process in a negotiation sequence of FIG. 5.

FIG. 10 illustrates a flowchart showing another example of a negotiation process in a negotiation sequence of FIG. 5.

Referring to FIG. 10, in a negotiation process (S410a), the responder 20 may examine a local rule and local status (S621) and generate a suggestion (S622). The responder 20 may transmit the suggestion to the requestor 10 (S623).

The requestor 10 may determine whether the suggestion is acceptable (S611). Operations S621, S622, S623 and S611 are the same as operations S321, S322, S323 and S315 in FIG. 5, and thus, repetitive descriptions thereof are omitted.

When it is determined that the suggestion is not acceptable, the requestor 10 may transmit a suggestion re-request to the responder 20 (S612).

In response to the suggestion re-request, the responder 20 may generate and transmit a new suggestion to the requestor 10. Otherwise, when it is determined that the suggestion is acceptable, the requestor 10 may transmit a suggestion acceptance to the responder 20.

In the embodiment described with reference to FIG. 5, the requestor 10 may generate a counter suggestion. However, in the example embodiment shown in FIG. 10, the requestor 10 does not generate a counter suggestion and instead transmits a suggestion re-request to the responder 20. In an example embodiment, the requestor 10 may transmit a suggestion re-request to responder 20 until a suggestion to be accepted is received.

Figure 11:
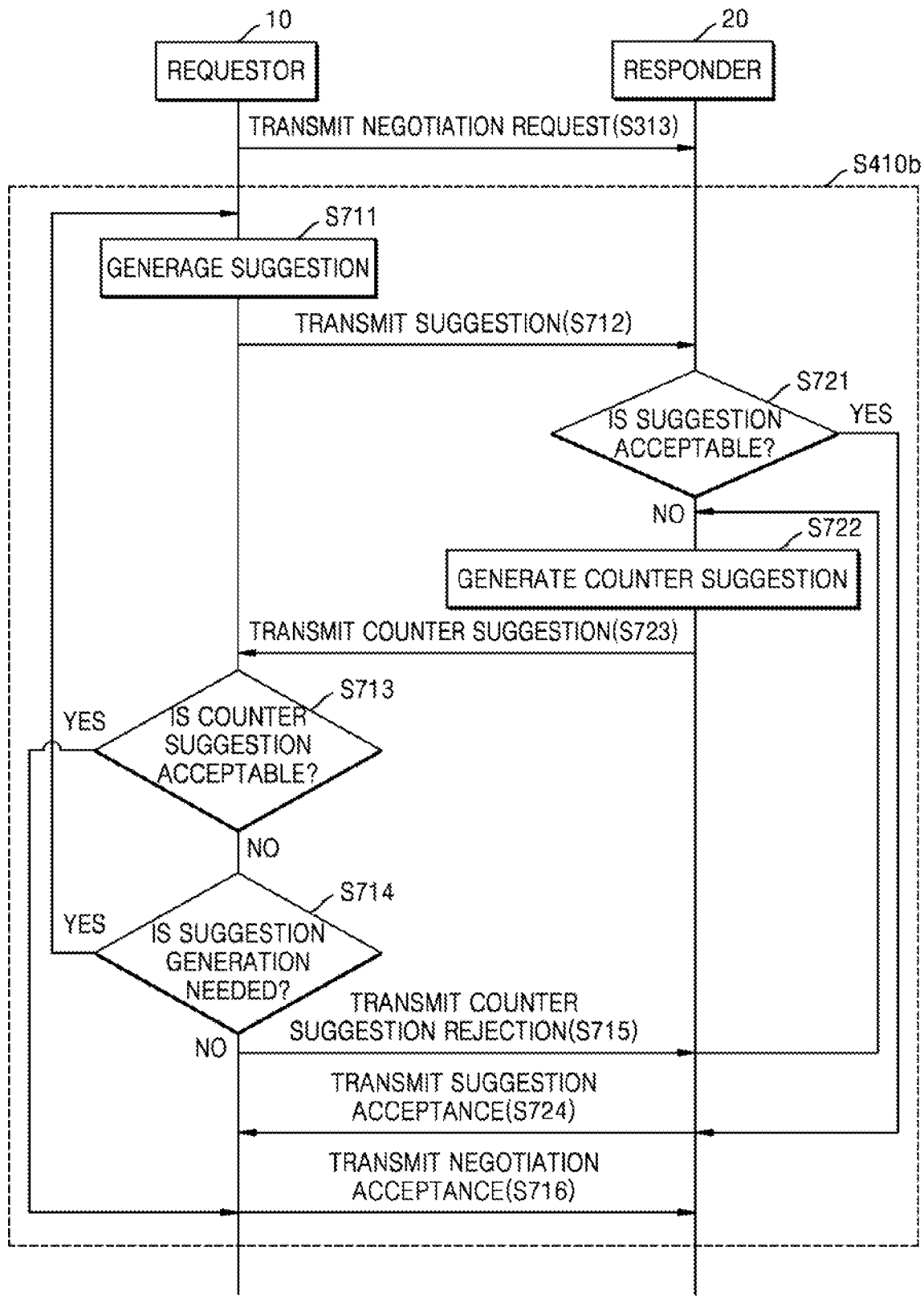
FIG. 11 illustrates a flowchart showing another example of a negotiation process in a negotiation sequence of FIG. 5.

FIG. 11 illustrates a flowchart showing another example of a negotiation process in a negotiation sequence of FIG. 5.

According to the embodiment of FIG. 11, except for the embodiments of FIG. 5 and FIG. 10, the requestor 10 may generate and transmit a suggestion from the beginning of a negotiation process (S410b).

The requestor 10 may generate a suggestion reflecting a target standard (for example, a local policy, thereby suggesting a changed local policy) (S711) and transmit the generated suggestion to responder 20 (S712).

The responder 20 may determine whether the received suggestion is acceptable (S721), and when it is determined that the received suggestion is not acceptable, the responder 20 may generate a new suggestion, i.e., a counter suggestion (S722) and transmit the counter suggestion to the requestor 10 (S723). Otherwise, when it is determined that the received suggestion is acceptable, the responder 20 may transmit a suggestion acceptance to the requestor 10. (S724)

When the counter suggestion is received, the requestor 10 may determine whether the counter suggestion is acceptable (S713). When it is determined that the counter suggestion is not acceptable, the requestor 10 may determine whether a new suggestion is to be generated (S714). When it is determined that a suggestion needs to be generated, the requestor 10 may regenerate a suggestion (S711). Otherwise, when it is determined that a suggestion does not need to be generated, the requestor 10 may transmit a counter suggestion rejection to the responder 20 (S715). The responder 20 may regenerate and transmit a counter suggestion to the requestor 10.

When it is determined that a counter suggestion is acceptable or when a suggestion acceptance is received from the responder 20, the requestor 10 may transmit a negotiation acceptance to the responder 20 (S716). Thus, the negotiation process (S410b) may be completed.

A negotiation process was described in various embodiments with reference to FIGS. 5, 10 and 11. However, embodiments are not limited thereto. The negotiation process may vary in various ways of transmitting and receiving a suggestion and a reply of the suggestion between the requestor 10 and the responder 20.

Figure 12:
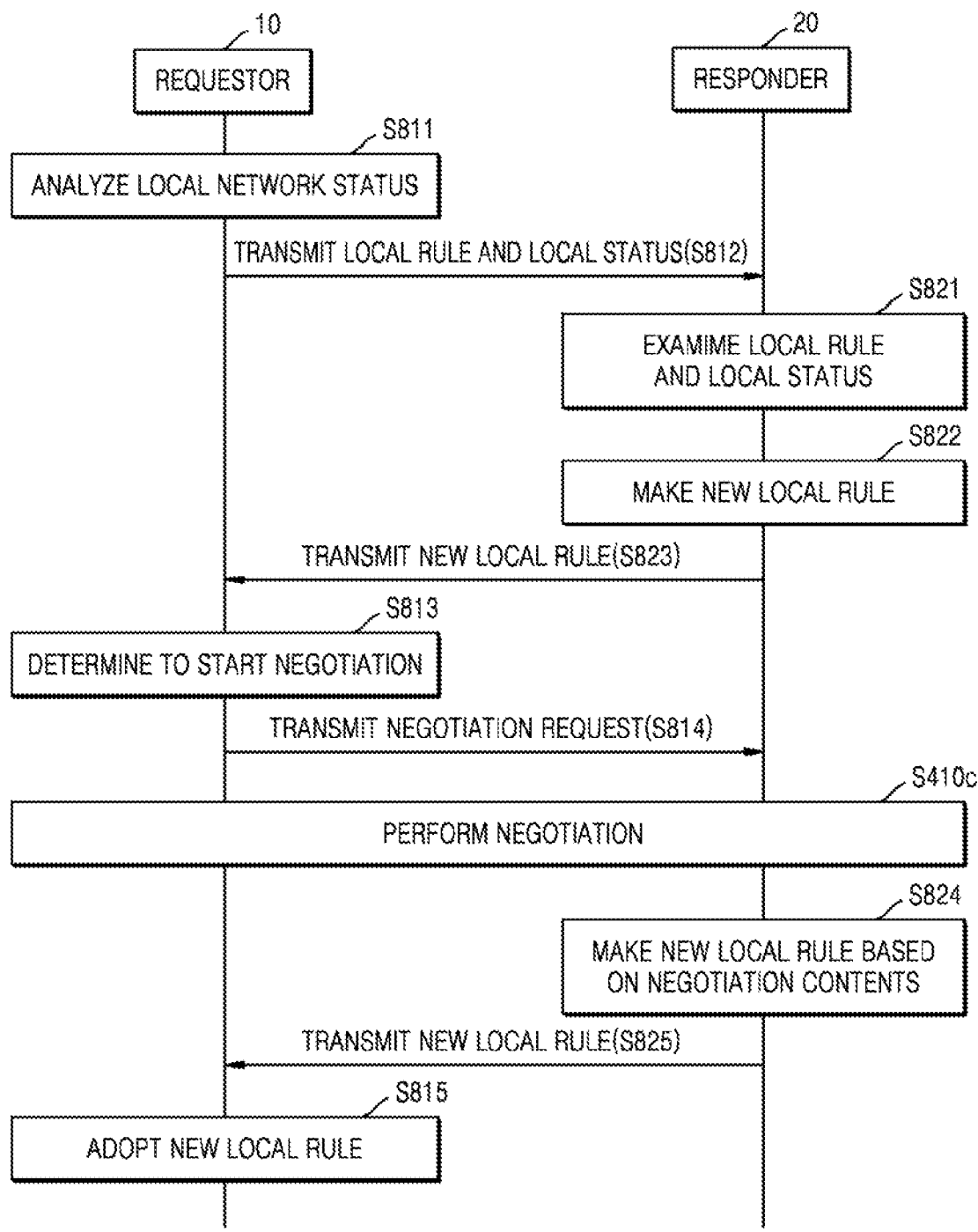
FIG. 12 illustrates a flowchart showing a negotiation sequence according to an example embodiment of the inventive concept.
Figure 13:
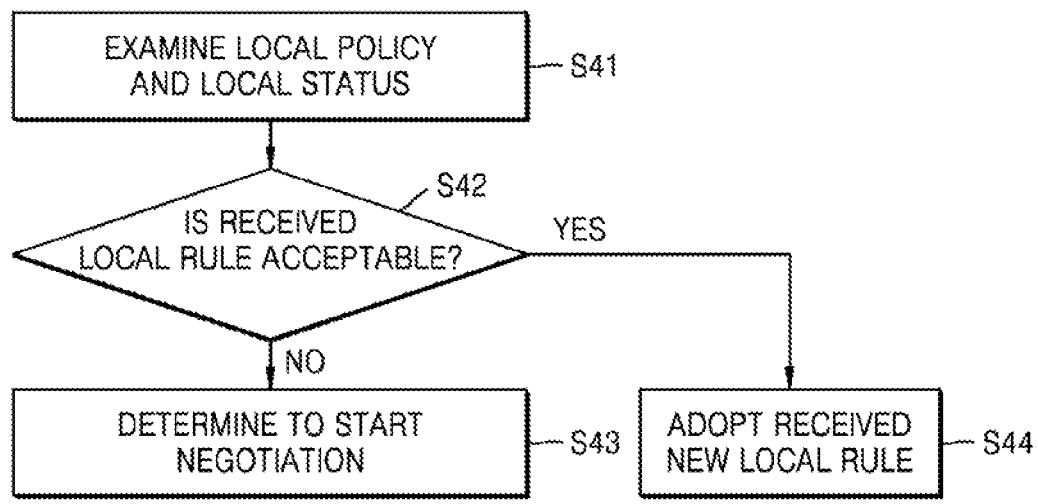
FIG. 13 illustrates a flowchart showing an example embodiment of an operation of FIG. 12 in which it is determined whether to start a negotiation.

FIG. 12 illustrates a flowchart showing a negotiation sequence according to an example embodiment of the inventive concept, and FIG. 13 illustrates a flowchart showing an example embodiment of an operation of FIG. 12 in which it is determined whether to start a negotiation.

A negotiation sequence of FIG. 12 may apply to the data processing system 1000 of FIG. 1. For example, the requestor 10 and the responder 20 of FIG. 12 may respectively correspond to the control device 100 and the server 200 of the data processing system 1000.

Referring to FIG. 12, the requestor 10 may analyze a status of a local network (Hereinafter, referred to as a local status) (S811). For example, when the requestor 10 is the control device 100, the control device 100 may receive status information from at least one of the end devices 301, 302, and 303 and analyze a local status based on the status information.

The requestor 10 may transmit a local rule and local status to the responder 20 (S812). For example, the requestor 10 may periodically transmit a local rule and/or local status to the responder 20.

The responder 20 may examine the local rule and local status (S821), and when needed, the responder 20 may make a new local rule based on a result of the examination (S822), thereby changing the local rule to result in a changed local rule. For example, the new local rule may define an intelligence that improves the performance of a local network, e.g., the end devices 301, 302, and 303) or the control device 100. The responder 20 may transmit the new local rule to the requestor 10 (S823). In an example embodiment, the responder 20 may also transmit a request for adoption of the new local rule. A rule such as described above may also be described as an operation rule.

When the new local rule is received, the requestor 10 may determine whether to start a negotiation (S813). Referring to FIG. 13, the requestor 10 may examine a local policy and local status (S41) and determine whether the received new local rule is acceptable based on the local policy and local status (S42). For example, when the received new local rule mismatches the local policy, the requestor 10 may determine that the received new local rule is not acceptable.

When it is determined that the received new local rule is not acceptable, the requestor 10 may determine to start a negotiation (S43). When it is determined that the received new local rule is acceptable, the requestor 10 may adopt the received new local rule (S44) and operate according to the received new local rule. For example, the control device 100 may adopt the local rule received from the server 200 and operate according to the local rule. Thus, the control device 100 may adapt to the received new local rule. In an example embodiment, the control device 100 may control the end devices 301, 302, and 303 according to the received new local rule.

Referring to FIG. 12, when it is determined to start a negotiation, the requestor 10 may transmit a negotiation request (signal or message) to the responder 20 (S814). Then, a negotiation process (S410c) may be performed. Descriptions given with reference to FIG. 5 and FIGS. 7A to 11 may apply to the negotiation process (S410c).

When a negotiation is completed, the responder 20 may make a new local rule based on contents of the negotiation (S824) and transmit the new local rule to the requestor 10 as a result of the negotiation (S825). The requestor 10 may adopt the local rule (S815). The requestor 10 may operate according to the adopted local rule and control other devices.

Figure 14:
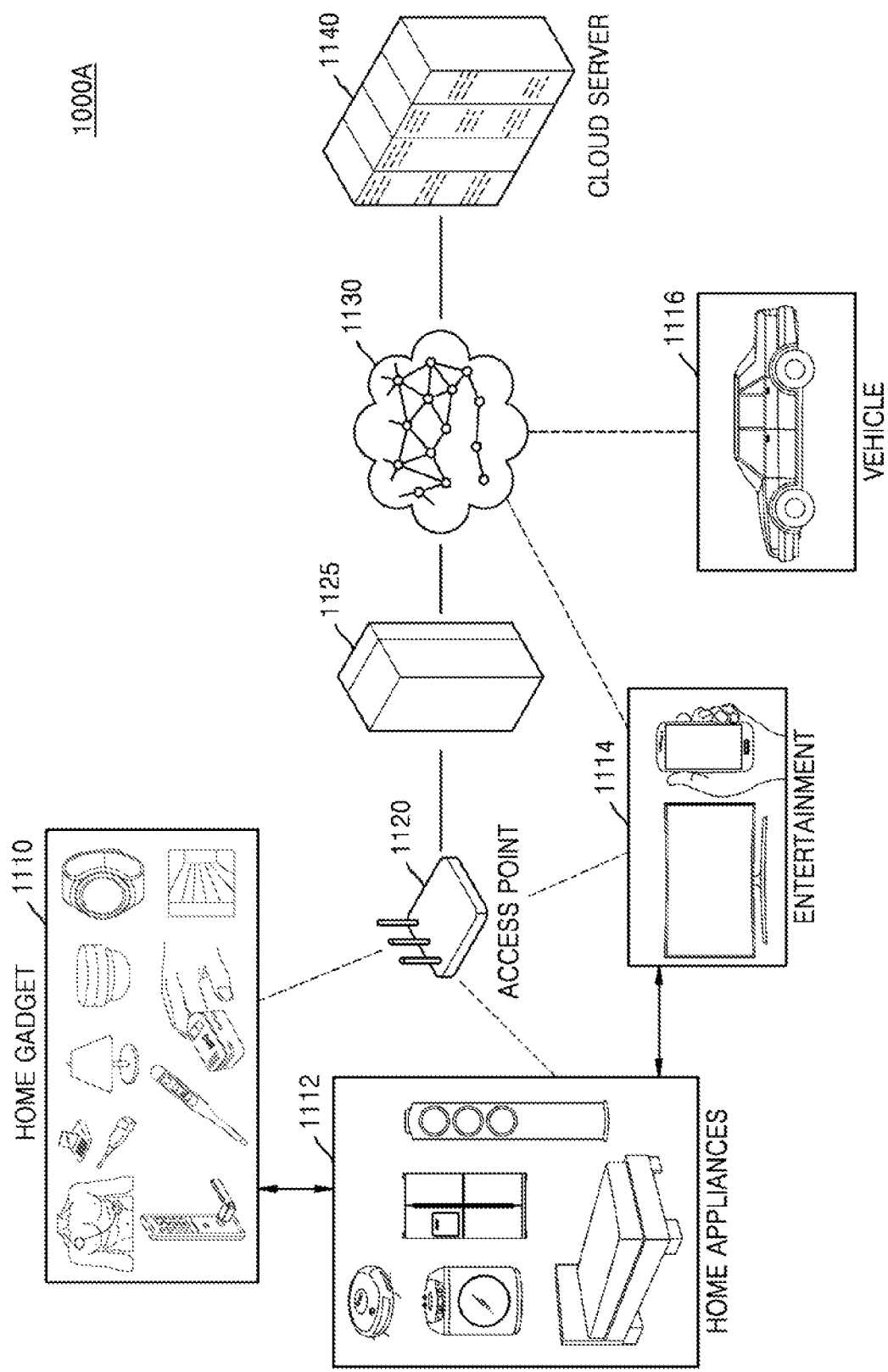
FIG. 14 illustrates a block diagram showing an example of an IoT network system according to an example embodiment of the inventive concept.

FIG. 14 illustrates a block diagram showing an example of an IoT network system according to an example embodiment of the inventive concept.

Referring to FIG. 14, an IoT network system 1000A may include a plurality of IoT devices 1110, 1112, 1114, and 1116, an access point 1120, a gateway 1125, a network 1130, and a server 1140 (e.g., a cloud server 1440).

An IoT may refer to a network between components using a wired or wireless connection. Thus, the IoT used herein may be described in various terms such as an IoT network system, a USN communication system, an MTC communication system, an MOC communication system, an M2M communication system or a D2D communication system.

In a wireless sensor network (WSN), each of the IoT devices 1110, 1112, 1114, and 1116 may be used as a sink node or a sensor node. A sink node is called a base station, may play a role as a gateway connecting the WSN and an external network (for example, the Internet), may allocate a task to each sensor node, and may collect an event sensed by each sensor node. A sensor node is a node in a WSN capable of processing sensory information and performing a gathering, and a sensor node may be a node capable of performing communication between nodes connected to each other in the WSN.

The IoT devices 1110, 1112, 1114, and 1116 may be categorized as groups according to each characteristic of IoT devices. For example, the IoT devices 1110, 1112, 1114, and 1116 may be respectively grouped into a home gadget group 1110, a home appliances group 1112, an entertainment group 1114, and a vehicle group 1116.

The IoT devices 1110, 1112, 1114, and 1116 may include an active IoT device, which operates using self-power, and a passive IoT device, which operates by power wirelessly and externally applied. An active IoT device may include, for example, a refrigerator, an air conditioner, a telephone, and an automobile. A passive IoT device may include, for example, a radio-frequency identification (RFID) tag and an NFC tag. In an example embodiment, the IoT devices 1110, 1112, 1114, and 1116 may include a passive communication interface, such as a quick response (QR) code, an RFID tag, or an NFC tag, or an active communication interface, such as a modem, or a transceiver.

The IoT devices 1110, 1112, 1114, and 1116 may gather data by using a sensor or transmit the gathered data to the outside through a wired/wireless communication interface. Further, the IoT devices 1110, 1112, 1114, and 1116 may transmit and/or receive control information and/or data through the wired/wireless communication interface.

The IoT network system 1000A may include the access point 1120. The IoT devices 1110, 1112 and 1114 may be connected to a network or other IoT devices through the access point 1120. The access point 1120 may be embedded into an IoT device. For example, the access point 1120 may be embedded into a television. In this case, a user may monitor or control at least one IoT device connected to the access point 1120 through a television display. In addition, the access point 1120 may be included in one of IoT devices. For example, a mobile phone may be both the IoT device and the access point 1120 connected to another IoT device. Here, the mobile phone may be connected to a communication network through a mobile communication network or a short range wireless network.

The gateway 1125 may change a protocol to allow the access point 1120 to access an external communication network (for example, an Internet network or a public communication network). The IoT devices 1110, 1112, and 1114 may be connected to the external communication network through the gateway 1125. In an embodiment, the gateway 1125 may be integrated into the access point 1120. In another embodiment, the access point 1120 may perform a function of a first gateway and the gateway 1125 may perform a function of a second gateway.

The gateway 1125 may be included in one of the IoT devices. For example, a mobile phone may be both the IoT device and the gateway 1125 connected to another IoT device. Here, the mobile phone may be connected to a mobile communication network.

The network 1130 may include an Internet network and/or a public communication network. The public communication network may include, for example, a mobile communication network (a mobile cellular network) and a satellite communication network. The network 1130 may be a channel through which information gathered by the IoT devices 1110, 1112, 1114, and 1116 is transmitted.

The cloud server 1140 may store or analyze data transmitted through the network 1130. Further, the cloud server 1140 may transmit a result of the analysis through the network 1130. The cloud server 1140 may store information related to at least one of the IoT devices 1110, 1112, 1114, and 1116 and analyze data transmitted from the relevant IoT device based on the stored information. Further, the cloud server 1140 may transmit the analysis result to the relevant IoT device or a user device through the network 1130. For example, in a case of the IoT device that measures a blood sugar level of a user in real time, the cloud server 1140 may store a blood sugar limit preset by the user and receive the measured blood sugar level through the network 1130. The cloud server 1140 may transmit information informing of danger based on a comparison between the blood sugar limit and the transmitted blood sugar level to the user device and/or the relevant IoT device.

In an example embodiment, the cloud server 1140 may include a distributed server and a plurality of servers. The distributed server may be connected to a plurality of servers to distribute jobs to be transmitted to each server. The distributed server may analyze a request transmitted from the network 1130 by scheduling, predicting amounts of the relevant data and jobs, and communicating with at least one of the servers. In this case, the distributed server may receive status information of each server and apply the status information to scheduling. An overall performance of the IoT network system 1000A may be improved by scheduling of the distributed server.

As an example embodiment, the distributed server may include a distributed computing system operated by a distributed file system (DFS). For example, a distributed server may be operated by one or more of various DFSs such as a Hadoop DFS (HDFS), a Google File System (GFS), a Cloud store, a Coda, a Network File System (NFS), and a General Parallel File System (GPFS).

In the IoT network system 1000A according to an example embodiment of the inventive concept, at least two of the devices, e.g., the cloud server 1140, the gateway 1125, and the IoT devices 1110, 1112, 1114, and 1116, may dynamically determine an intelligence by a negotiation and thus, an individual status of each device, an overall status, and a status of a local network LNT and/or core network may be considered when determining or changing an intelligence.

For example, the gateway 1125 may receive status information from at least one of the IoT devices 1110, 1112, 1114, and 1116, and may analyze a status of a local network where the IoT devices 1110, 1112, 1114, and 1116 and the gateway 1125 are included, based on the received status information. The gateway 1125 may determine whether to start a negotiation with the cloud server 1140 based on a status of a local network, and when it is determined that a negotiation is needed, the gateway 1125 may start a negotiation with the cloud server 1140.

For example, the gateway 1125 and the cloud server 1140 may respectively operate as the requestor 10 (FIG. 3) and the responder 20 (FIG. 3) in the example embodiments described above. However, embodiments are not limited thereto. One of the IoT devices 1110, 1112, 1114, and 1116, the gateway 1125 and the cloud server 1140 may operate as a requestor, and the other thereof may operate as a responder. A negotiation process described with reference to FIGS. 4 to 13 may apply to devices playing roles of a requestor and a responder among the IoT devices 1110, 1112, 1114, and 1116, the gateway 1125 and the cloud server 1140.

As described above, in the IoT network system 1000A according to an example embodiment of the inventive concept, an intelligence of devices may be determined or changed by a negotiation between the devices.

In an example embodiment, in the IoT network system 1000A, each of the devices may take a role (for example, various data processing functions) by a negotiation.

In an example embodiment, devices may determine by a negotiation a method of controlling a local network, e.g., a channel allocating method, and a traffic controlling method.

In an example embodiment, devices may determine by a negotiation a system configuration, e.g., a sensing period, a reporting period, and a security setting of IoT devices, a reporting period of a gateway, and an energy setting of a local network.

Thus, loads may be distributed between devices and functions of the devices may be optimized. Also, utilization of computing resources may be optimized, and traffic overhead between devices may be reduced. In this regard, the performance of the IoT network system 1000A may be improved.

Figure 15:
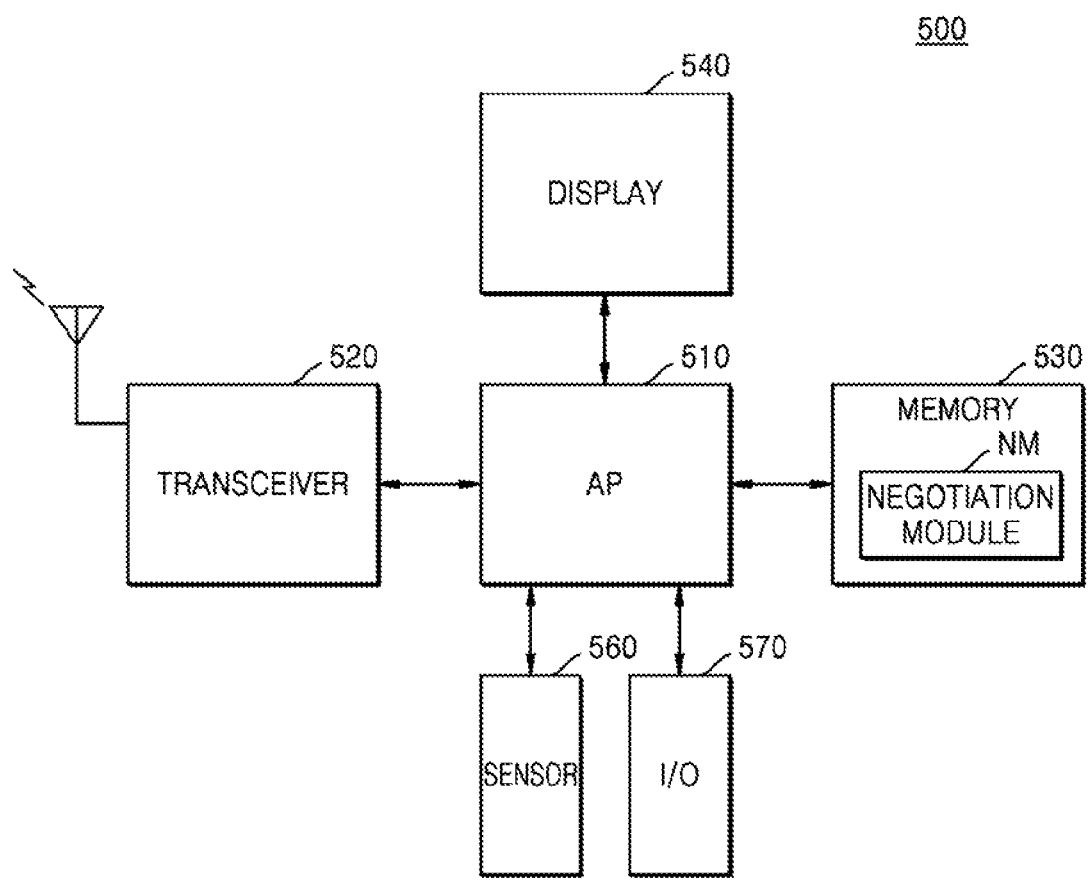
FIG. 15 illustrates a block diagram showing an example of an IoT device according to an example embodiment of the inventive concept.

FIG. 15 illustrates a block diagram showing an example of an IoT device according to an example embodiment of the inventive concept.

Referring to FIG. 15, an IoT device 500 may include an application processor (AP) 510, a communication interface 520, a memory 530, a display 540, a sensor 560 and an input/output device 570.

The IoT device 500 may include a communication interface 520 for communicating with the outside. The communication interface 520 may be, for example, a wireless short range communication interface such as a LAN, Bluetooth, Wi-Fi, or ZigBee or a modem communication interface which can access a mobile cellular network such as power line communication (PLC), 3rd generation (3G), long term evolution (LTE), and the like.

The AP 510 may control the general operation of the IoT device 500. The AP 510 may perform a calculation. The AP 510 may perform a negotiation module NM implemented as computer instructions.

According to an example embodiment, the AP 510 may include a single core or a multi-core processor. According to an example embodiment, the AP 510 may further include a cache memory located in or outside the AP 510

The IoT device 500 may transmit and/or receive information to and/or from the access point 1120 (FIG. 14) or the gateway 1125 (FIG. 14) through the communication interface 520. Also, the IoT device 500 may communicate with a user device or another device to transmit and/or receive control information or data of the IoT device 500.

The sensor 560 may be, for example, an image sensor for sensing an image. The sensor 560 may be connected to the AP 510 to transmit generated image information to the AP 510. The sensor 560 may be a bio sensor for sensing biometric information. The sensor 560 may be any sensor such as an illuminance sensor, a sound sensor, and an acceleration sensor.

The display 540 may display information on an inner status of the IoT device 500. The display 540 may include a touch sensor (not shown). Also, the display 540 may include an input or output function and an exterior for a user interface. A user may control the IoT device 500 through a touch sensor and a user interface.

The input/output device 570 may include input means such as a touch pad, a keypad, an input button, and the like, and output means such as a display, a speaker, and the like.

The memory 530 may store control instruction code for controlling the IoT device 500, control data, or user data. For example, the memory 530 may store the negotiation module NM implemented as computer instructions. The negotiation module NM may be operated by the AP 510 as described above.

The memory 530 may include at least one of a volatile memory and a nonvolatile memory. The nonvolatile memory may include ROM, Programmable ROM (PROM), Electrically Programmable ROM (EPROM), Electrically Erasable and Programmable ROM (EEPROM), a flash memory, Phase-change RAM (PRAM), Magnetic RAM (MRAM), Resistive RAM (RRAM), and Ferroelectric RAM (FRAM). The volatile memory may include at least one of various memories such as Dynamic RAM (DRAM), Static RAM (SRAM), Synchronous DRAM (SDRAM), Phase-change RAM (PRAM), Magnetic RAM (MRAM), Resistive RAM (RRAM), and Ferroelectric RAM (FeRAM).

The IoT device 500 may further include a battery therein for internal power supply or a power supply unit for receiving power from outside. In addition, the IoT device 500 may further include a storage device. The storage device may be a non-volatile medium such as a hard disk (HDD), a Solid State Disk (SSD), an embedded Multi Media Card (eMMC), or a Universal Flash Storage (UFS). The storage device may store user information provided through an input/output unit 570 and sensing information gathered through a sensor 560.

In the IoT device 500 according to an example embodiment of the inventive concept, the AP 510 may operate the negotiation module NM and may perform a negotiation with other devices of the IoT network system 1000A, e.g., the gateway 1125 or the cloud server 1140 about a function or configuration of the IoT device 500 according to a negotiation algorithm of the negotiation module NM. In this regard, a function of the IoT device 500 may be improved, and a processing function determined by a status of the IoT device 500 or a status of a local network where the IoT device 500 is included may be performed. In addition, a configuration may be optimally set in a status of the IoT device 500 or a status of a local network where the IoT device 500 is included.

Figure 16:
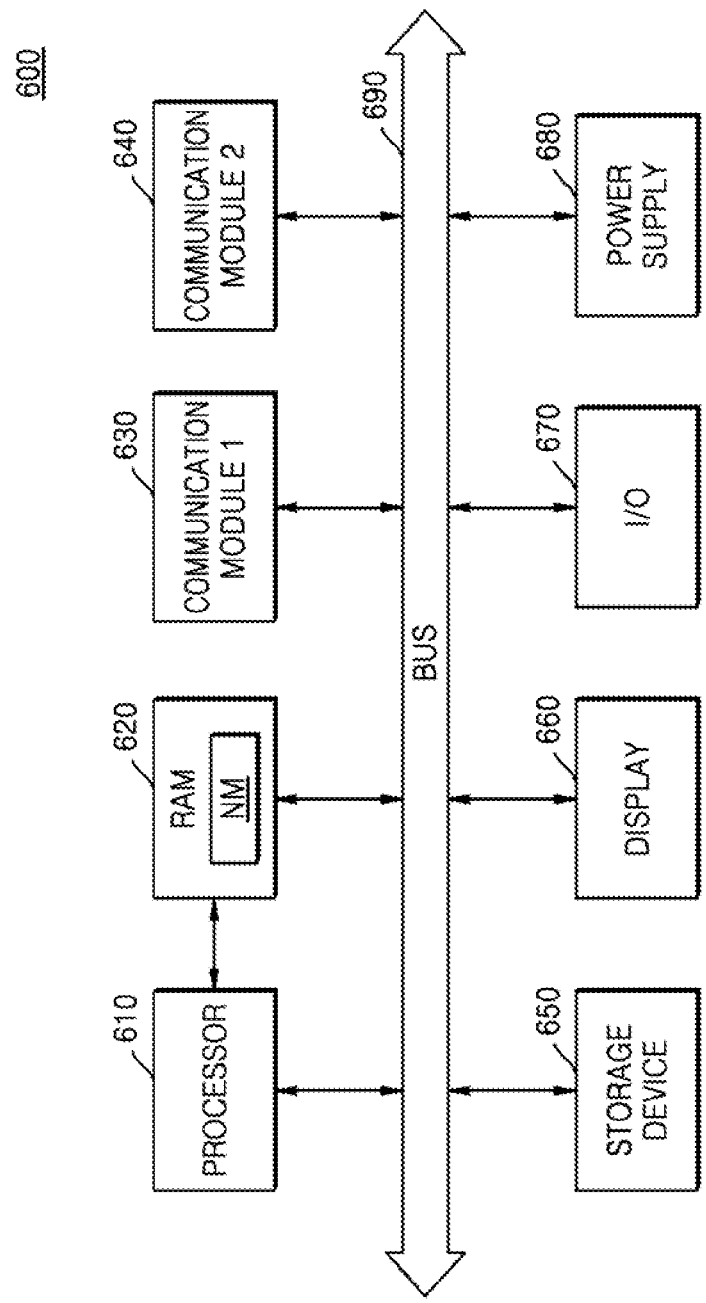
FIG. 16 illustrates a block diagram showing an example of a gateway according to an example embodiment of the inventive concept.

FIG. 16 illustrates a block diagram showing an example of a gateway according to an example embodiment of the inventive concept.

Referring to FIG. 16, a gateway 600 may include a processor 610, RAM 620, a first communication module 630, a second communication module 640, a storage device 650, a display 660, an input/output device 670, and a power supply unit 680. Configuration components of the gateway 600 may transmit and receive data through a bus 690.

The processor 610 may control a general operation of the gateway 600. The processor 610 may be embodied as a Central Processing Unit (CPU), a micro processor, an AP, and the like. In an example embodiment, the processor 610 may include a single core or a multi-core processor. The processor 610 may load a negotiation module NM implemented as computer program code, e.g., software or firmware, to the RAM 620 and operate the negotiation module NM.

The processor 610 may perform a negotiation with other devices of the IoT network system 1000A, e.g., the IoT devices 1110, 1112, 1114, and 1116 or the cloud server 1140, according to a negotiation algorithm of the negotiation module NM. The processor 610 may perform a negotiation about, for example, a data processing function, a network controlling function, and a configuration of the gateway 600. The processor 610 may control an operation of the gateway 600 based on a rule or rule-set obtained by a negotiation or may control the IoT devices 1110, 1112, 1114, and 1116 (FIG. 14).

The RAM 620 may operate as a working memory for an inner system of the gateway 600. The RAM 620 may store control instruction code for controlling the gateway 600, control data or user data. The RAM 620 may include at least one of a volatile memory and a nonvolatile memory.

The gateway 600 may include the first communication module 630 and the second communication module 640. The first communication module 630 and the second communication module 640 may include different communication interfaces. For example, the first communication module 630 may include a communication interface for communicating with the IoT devices 1110, 1112, 1114, and 1116 (FIG. 14) or the access point 1120, i.e., a communication interface applied to a local network. The second communication module 640 may include a communication interface for communicating with the cloud server 1140, i.e., a communication interface applied to a core network.

The storage device 650, the display 660, the input/output device 670, and the power supply unit 680 operate in substantially the same manner as described with reference to FIG. 15. Thus, repetitive descriptions thereof are omitted.

Figure 17:
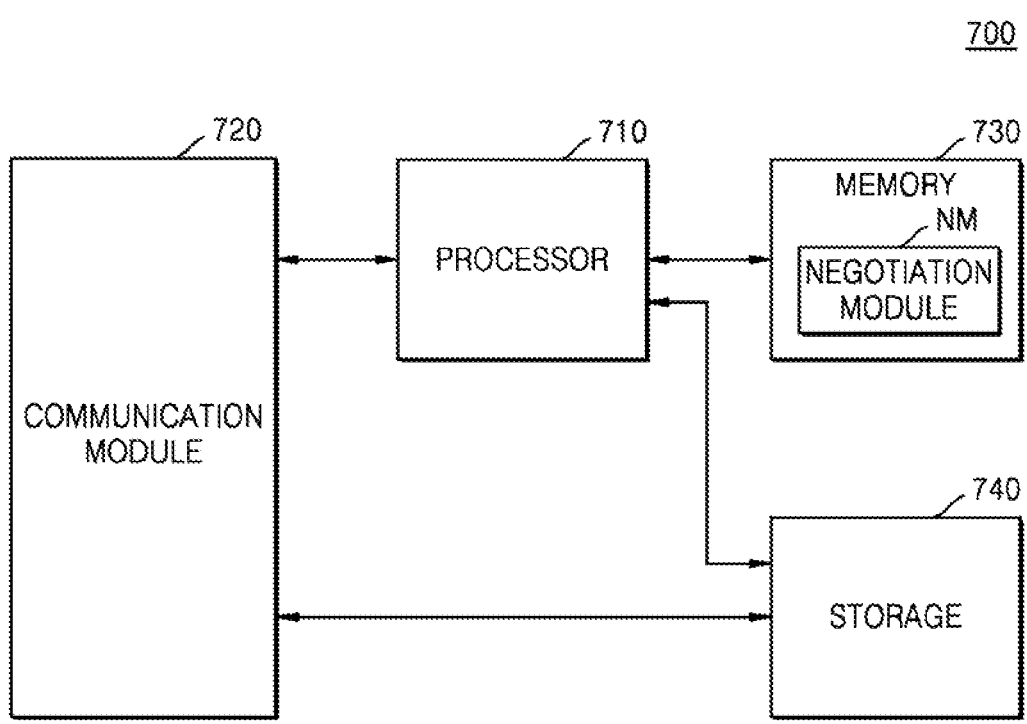
FIG. 17 illustrates a block diagram showing an example of a cloud server according to an example embodiment of the inventive concept.

FIG. 17 illustrates a block diagram showing an example of a cloud server according to an example embodiment of the inventive concept.

Referring to FIG. 17, a cloud server 700 may include a processor 710, a communication module 720, a memory 730, and a storage 740.

The communication module 720 may be used to communicate with the IoT devices 1110, 1112, 1114, and 1116 (FIG. 14) or the gateway 1125 (FIG. 14) through the communication network 1130 (FIG. 14), e.g., a core network. The communication module 720 may receive information and data through the network 1130. Alternatively, the communication module 720 may transmit, through the network 1130, a result needed to provide service to a user.

The processor 710 may process data received through the communication module 720 and output a result needed to provide service. The processor 710 may perform arithmetic operations and/or a logical operations. The processor 710 may analyze and process data and then store the analyzed and processed data in the storage 740. The processor 710 may also form big data with the analyzed data. The processor 710 may load a negotiation module NM implemented as computer program code, e.g., software or firmware, to the memory 730 and then may operate the negotiation module NM. The term "big data" as used herein refers to massive amounts of data collected and usable for real-world application such as IoT applications.

The processor 710 may perform a negotiation with other devices of the IoT network system 1000A (FIG. 14), e.g., the IoT devices 1110, 1112, 1114, and 1116 or the gateway 1125 (FIG. 14), according to a negotiation algorithm of the negotiation module NM. In an example embodiment, the processor 710 may request a negotiation or perform a negotiation in response to a negotiation request. For example, the processor 710 may perform negotiation with the gateway 1125 about a data processing function, a network controlling function, and a configuration of the gateway 1125. Alternatively, the processor 710 may perform negotiation with the IoT devices 1110, 1112, 1114, and 1116 or the gateway 1125 about a processing function, a network setting, and a configuration of the IoT devices 1110, 1112, 1114, and 1116.

In an example embodiment, the processor 710 may control an operation of the cloud server 700, considering a rule or rule-set obtained by a negotiation. For example, when performing a negotiation with the gateway 1125 about a role of the cloud server 1140 and the gateway 1125, e.g., a scope of a data processing function, the processor 710 may perform a function of the cloud server 700 that is determined by a result of the negotiation.

The memory 730 and/or the storage 740 may temporarily or semi-permanently store data processed or to be processed by the processor 710.

The memory 730 may be embodied as a volatile memory or a nonvolatile memory. The memory 730 may be embodied as DRAM, SRAM, PRAM, RRAM, MRAM, or a combination thereof. The memory 730 may store instruction code, control data, and the like for controlling the cloud server 700. The negotiation module NM may be implemented as program code, may be stored in the memory 730, and may be operated by the processor 710.

The storage 740 may be a non-volatile medium such as an HDD, an SSD, an eMMC, or a UFS. The storage 740 may store data analyzed or gathered in the cloud server 700. The storage 740 may store a local rule or status of a local network. In addition, the storage 740 may store history related to the local rule or status of the local network.

The IoT device 500 may further include a battery therein for internal power supply or a power supply unit for receiving power from outside. In addition, the IoT device 500 may further include a storage device. The storage device may be a non-volatile medium such as an HDD, an SSD, an eMMC, or a UFS. The storage device may store user information provided through an input/output unit 570 and sensing information gathered through a sensor 560.

While the inventive concept has been particularly shown and described with reference to embodiments thereof, it will be understood that various changes in form and details may be made therein without departing from the spirit and scope of the following claims.

What is claimed is:

1. A method of operating a gateway of an Internet of Things system, the method comprising:

receiving at the gateway status information from at least one of a plurality of end devices included in a local network;
determining by the gateway whether to start a negotiation based on a status of the local network that is analyzed based on the status information;
transmitting a negotiation request from the gateway to an external device, the external device being a server;
receiving a suggestion corresponding to the negotiation request from the external device;
transmitting a reply indicating whether to accept the suggestion to the external device,
wherein the negotiation request comprises a negotiation object, and
wherein the negotiation object corresponds to at least one of a data processing function, a network controlling function, and a system configuration; and
generating by the gateway a counter suggestion that is provided as the reply, based on the status of the local network and a local policy.

2. The method of claim 1, further comprising
determining whether to accept the suggestion based on the status of the local network and a local policy.

3. The method of claim 1, wherein the generating of the counter suggestion comprises
changing the local policy based on the received suggestion; and
generating the counter suggestion based on the changed local policy.

4. The method of claim 1, further comprising
receiving a result of the negotiation; and
adopting the result of the negotiation,
wherein the result of the negotiation comprises an operation rule of a control device or at least one of the end devices.

5. The method of claim 4, wherein the gateway performs a processing function based on the operation rule.

6. The method of claim 4, wherein the gateway controls at least one of the end devices based on the operation rule.

7. The method of claim 1, wherein the determining whether to start the negotiation comprises comparing a status value indicating the status of the local network with a threshold condition.

8. A method of operating a server of an Internet of Things (IoT) system, the method comprising:
receiving a negotiation request at a server from an external device external to the server and at a local network, the negotiation request being part of a negotiation and the external device being either an IoT device or a gateway device that communicates between the server and the IoT device;
generating, by the server, a suggestion corresponding to the negotiation request based on a status of the local network determined at least in part based on a status of the IoT device, wherein the IoT device and a gateway are included in the local network;
transmitting the suggestion from the server to the external device; and
receiving a reply sent from the external device to the server indicating whether the external device accepts the suggestion.

9. The method of claim 8, when the received reply comprises an acceptance of the suggestion, further comprising
changing a local rule corresponding to the IoT device or the gateway based on the suggestion; and
transmitting the changed local rule as a result of the negotiation.

10. The method of claim 8, further comprising
receiving at the server the status of the local network from the external device; and
storing the status of the local network in an internal database internal to the server.

11. A method of communicating in an Internet of Things (IoT) system, the method comprising:
receiving, by a control device, status information from at least one of a plurality of end devices included in a local network of the IoT system;
determining, by the control device, to start a negotiation based on a status of the local network that is analyzed based on the status information;
as a result of determining to start a negotiation, transmitting a negotiation request from the control device to an external device, and receiving the negotiation request at the external device;
performing a negotiation between the control device and the external device, to determine a rule or rule-set to use by the control device for communication; and
selecting and using the rule or rule-set for operations of the control device.

12. The method of claim 11, further comprising:
determining to start the negotiation by comparing a status value indicating the status of the local network with a threshold condition.

13. The method of claim 12, wherein performing the negotiation includes:
generating a suggestion by a first device from among of the control device and the external device and sending the suggestion to a second device from among the control device and the external device, the second device being the other device that is not the first device;
receiving the suggestion by the second device; and
responding to the suggestion by: transmitting an acceptance message to the first device, sending a counter suggestion to the first device, or sending a request for another suggestion to the first device.

14. The method of claim 13, further comprising:
changing a local rule corresponding to the local network based on the suggestion, the counter suggestion, or the another suggestion.

* * * * *